US012697911B2

(12) United States Patent
Chin et al.

(10) Patent No.: US 12,697,911 B2
(45) Date of Patent: Aug. 4, 2026

(54) VEHICLE SEAT ASSEMBLY DEVICE

(71) Applicant: YKK Corporation, Tokyo (JP)

(72) Inventors: Sooil Chin, Seoul (KR); Daisuke Satake, Seoul (KR); Akira Sato, Seoul (KR); Naoki Kasuya, Seoul (KR); Jinwoo Park, Seoul (KR)

(73) Assignee: YKK Corporation, Tokyo (JP)

( * ) Notice: Subject to any disclaimer, the term of this patent is extended or adjusted under 35 U.S.C. 154(b) by 262 days.

(21) Appl. No.: 18/290,600

(22) PCT Filed: Mar. 23, 2022

(86) PCT No.: PCT/JP2022/013760
§ 371 (c)(1),
(2) Date: Jan. 19, 2024

(87) PCT Pub. No.: WO2023/002706
PCT Pub. Date: Jan. 26, 2023

(65) Prior Publication Data
US 2025/0010774 A1      Jan. 9, 2025

(30) Foreign Application Priority Data
Jul. 21, 2021      (KR) ........................ 10-2021-0095715

(51) Int. Cl.
B60N 2/58 (2006.01)
B60N 2/68 (2006.01)

(52) U.S. Cl.
CPC ........... B60N 2/5825 (2013.01); B60N 2/682 (2013.01)

(58) Field of Classification Search
CPC ...... B60N 2/5891; B60N 2/6045; B60N 2/72; B60N 2/5816; B60N 2/5825; B60N 2/682; B60N 2/90; B60N 2/58
See application file for complete search history.

(56) References Cited

U.S. PATENT DOCUMENTS

| | | | |
|---|---|---|---|
| 6,434,806 B1 | 8/2002 | Walt, II | |
| 2002/0108222 A1* | 8/2002 | Tillner | .................... B68G 7/05 |
| | | | 29/91.1 |

(Continued)

FOREIGN PATENT DOCUMENTS

| | | |
|---|---|---|
| JP | H01-082000 A | 6/1989 |
| JP | H03-112100 A | 11/1991 |

(Continued)

OTHER PUBLICATIONS

Osada Hiroyoshi; JP08010473A; Machine Translation (Year: 1996).*

(Continued)

*Primary Examiner* — Lee A Holly

(74) *Attorney, Agent, or Firm* — Kilpatrick Townsend & Stockton LLP

(57) ABSTRACT

This vehicle seat assembly device includes: a base section; a cushion working section that is connected to one side of the base section, that places a seat cushion in which a plurality of first through holes are formed, and that is capable of connecting a seat cover to the seat cushion; and a cover working section that is connected to the other side of the base section, that places a seat cover, and that can transfer the seat cover to the upper part of the seat cushion. The cover working section includes a cushion rest which connected to the base section and on which a wire and the seat cushion can be placed.

9 Claims, 23 Drawing Sheets

(56)          References Cited

U.S. PATENT DOCUMENTS

2007/0028435  A1*    2/2007   Ormachea ............ B25J 15/0028
                                                                          29/91
2017/0129766  A1      5/2017   Fukuzawa et al.

FOREIGN PATENT DOCUMENTS

| | | | | |
|---|---|---|---|---|
| JP | 08010473 | A | * | 1/1996 | ............. B68G 7/06 |
| JP | H08-010473 | A | | 1/1996 |
| KR | 200213839 | Y1 | | 7/1999 |
| KR | 2018-0130317 | A | | 12/2018 |
| KR | 101951609 | B1 | | 2/2019 |
| WO | 2015-198430 | A1 | | 12/2015 |

OTHER PUBLICATIONS

International Preliminary Report on Patentability, PCT Patent Application No. PCT/JP2022/013760, Jan. 18, 2024, 7 pages.
International Search Report, PCT Patent Application No. PCT/JP2022/013760, Jun. 24, 2022, 5 pages.
Written Opinion, PCT Patent Application No. PCT/JP2022/013760, Jun. 24, 2022, 3 pages.
Korean Patent Application No. 10-2021-0095715, Dec. 20, 2022, 11 pages.
Office Action, Chinese Patent Application No. 202280051001.1, Mar. 31, 2026, 6 pages.

* cited by examiner 50    354    314        312    40    355        352    353

VEHICLE SEAT ASSEMBLY DEVICE

TECHNICAL FIELD

The present invention relates to a vehicle seat assembly device, and more particularly to an assembly device for coupling a seat cover to a vehicle seat cushion.

BACKGROUND ART

A vehicle seat may include a seat frame that is connected to a vehicle body and supports various components, a seat cushion that is coupled to the seat frame and supports a passenger, and a seat cover that is coupled to the seat cushion and forms a surface.

The seat cushion is in the form of a foam pad, sponge, or non-woven fabric, and the seat cover is made of natural leather, man-made leather, or woven fabric.

Various structures and methods for maintaining the aesthetic design of a seat are employed to fix the seat cover to the seat cushion.

A hook ring method has problems in that a worker develops a musculoskeletal disease due to continuous work using a heavy hook ring machine, the number of work processes is large, and workability and productivity are reduced.

A method of fastening a clip coupled to a seat cover to a wire disposed in a groove of a seat cushion is also used.

Processes of manufacturing a vehicle seat are mostly carried out manually, resulting in low productivity and inefficient work.

KR20-0213839Y1 discloses a "cover assembly device for seat back of automatic vehicle" including a compressor, a pneumatic cylinder, a roller attached to a piston of the pneumatic cylinder, and a jig die to which a seat back in a padded state is fixed, in which as the roller moves up and down, a seat cover is automatically placed over the seat back in the padded state while being automatically pressed by a pressing pressure of the roller.

SUMMARY OF INVENTION

Technical Problem

An object of the present invention is to provide a vehicle seat assembly device capable of automating a vehicle seat manufacturing process that relies on manual labor.

Solution to Problem

The above object can be achieved by a vehicle seat assembly device including: a base portion: a cushion operating portion coupled to one side of the base portion, configured to allow a seat cushion formed with a plurality of first through holes to be disposed, and configured to couple a seat cover to the seat cushion; and a cover operating portion coupled to another side of the base portion, configured to allow the seat cover to be disposed, and configured to transfer the seat cover onto the seat cushion, in which the cushion operating portion may include a cushion placing stand that is coupled to the base portion and configured to allow a wire and the seat cushion to be disposed.

The above object can be achieved by the vehicle seat assembly device in which the cushion operating portion may include a fastening portion that is coupled to the base portion, configured to lower a clip coupled to a suspender of the seat cover to the first through hole, and configured to fix the clip to the wire located below the seat cushion.

The above object can be achieved by the vehicle seat assembly device in which the fastening portion may include a grip portion configured to restrict the clip, a coupling portion coupled to the grip portion and configured to actuate the grip portion, and a first lifting portion coupled to the coupling portion.

The above object can be achieved by the vehicle seat assembly device in which the base portion may include a first plate, a plurality of first supporting stands coupled to an upper portion of the first plate, and a second plate coupled to an upper portion of each of the first supporting stands.

The above object can be achieved by the vehicle seat assembly device in which the cushion placing stand may be coupled to the second plate, and the fastening portion may be coupled to the first plate.

The above object can be achieved by the vehicle seat assembly device in which the cushion placing stand may include a plurality of second supporting stands coupled to the second plate, a plurality of first frames coupled to the second supporting stands and configured to allow the seat cushion to be disposed, and a plurality of blocks coupled to the first frames and configured to allow the wire to be disposed.

The above object can be achieved by the vehicle seat assembly device in which the block may be configured to be inserted into the first through hole such that a position of the seat cushion is maintained constant.

The above object can be achieved by the vehicle seat assembly device in which a V-shaped groove may be formed on the block such that a position of the wire is maintained constant.

The above object can be achieved by the vehicle seat assembly device in which a second through hole may be formed inside the block such that the fastening portion is movable up and down.

The above object can be achieved by the vehicle seat assembly device in which the cover operating portion may include a cover placing stand coupled to the base portion and configured to allow the seat cover to be disposed, a transfer portion coupled to the base portion and configured to reciprocate between the one side and the other side of the base portion, a second lifting portion coupled to the transfer portion, a support portion coupled to the second lifting portion, and a holder coupled to the support portion and configured to restrict the clip.

Advantageous Effects of Invention

The vehicle seat assembly device according to the present invention includes: a base portion: a cushion operating portion coupled to one side of the base portion, configured to allow a seat cushion formed with a plurality of first through holes to be disposed, and configured to couple a seat cover to the seat cushion; and a cover operating portion coupled to another side of the base portion, configured to allow the seat cover to be disposed, and configured to transfer the seat cover onto the seat cushion, in which the cushion operating portion includes a cushion placing stand that is coupled to the base portion and configured to allow a wire and the seat cushion to be disposed. Therefore, a process of coupling the seat cover to the seat cushion can be automated.

Further, according to the vehicle seat assembly device of the present invention, the seat cover can be quickly and easily coupled to the seat cushion, so that productivity and work efficiency can be increased.

Further, according to the vehicle seat assembly device of the present invention, the process of coupling the seat cover to the seat cushion can be automated, so that the assembling quality of a vehicle seat can be increased.

Further, according to the vehicle seat assembly device of the present invention, the process of coupling the seat cover to the seat cushion can be automated, so that a vehicle seat of a certain quality can be produced.

4

Figure 23:
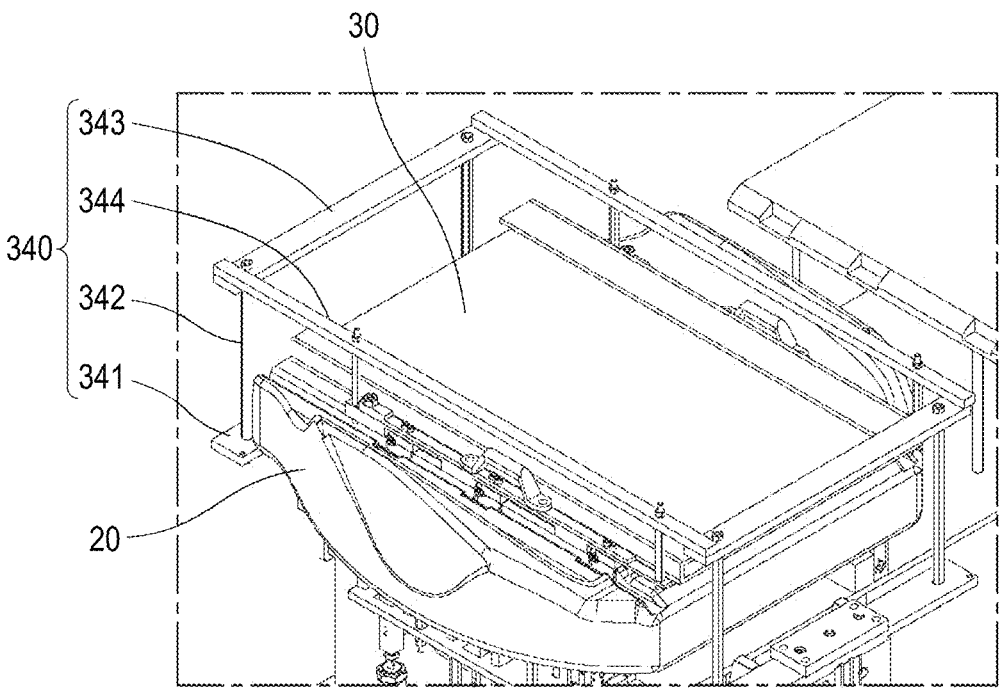
FIG. 23 is a perspective view showing a state in which the seat cover is disposed on the seat cushion by the cover operating portion.
Figure 24:
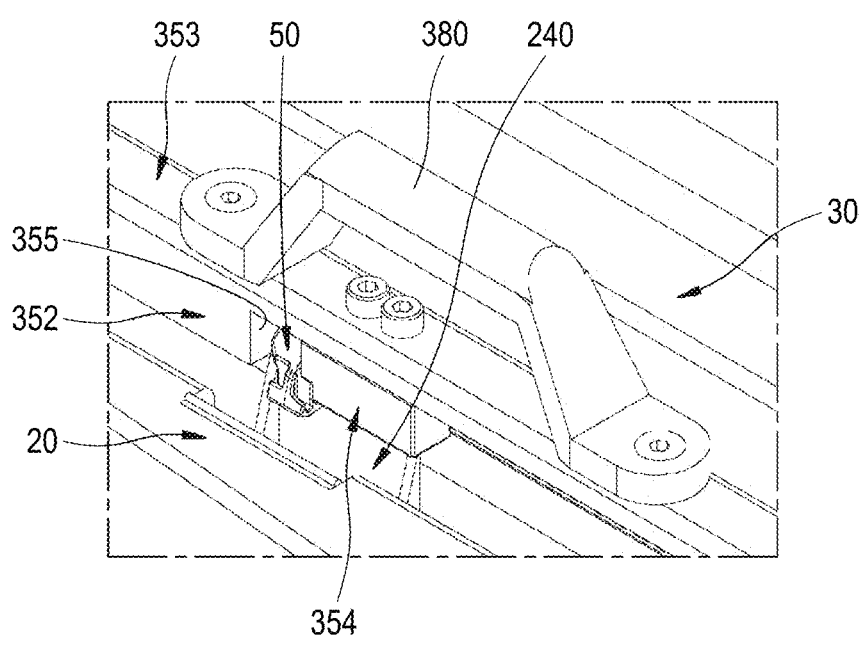

FIG. 24 is a perspective view showing a state in which the clamper of the cover operating portion restricts the clip in FIG. 23.

Figure 25:
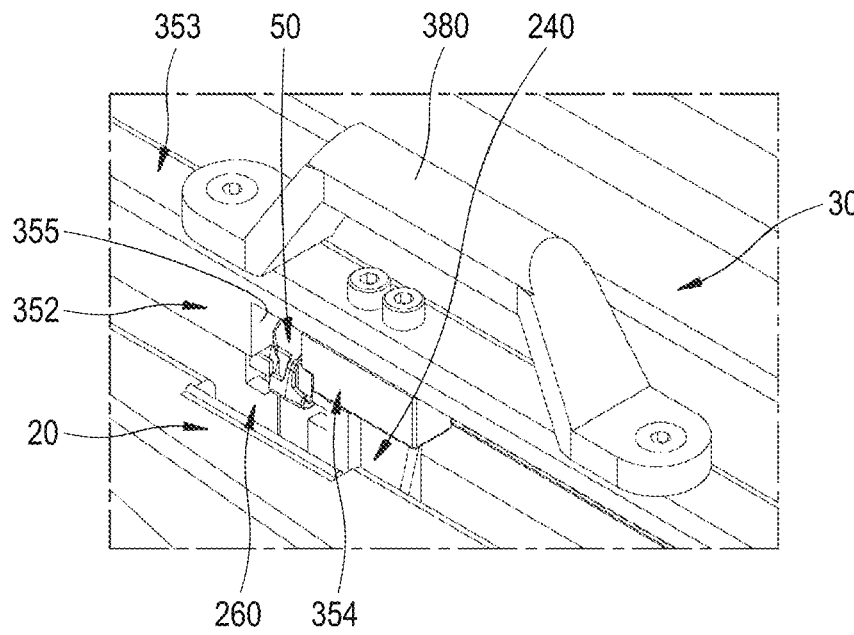

FIG. 25 shows a state in which the grip portion of the cushion operating portion is raised to restrict the clip in FIG. 24.

Figure 26:
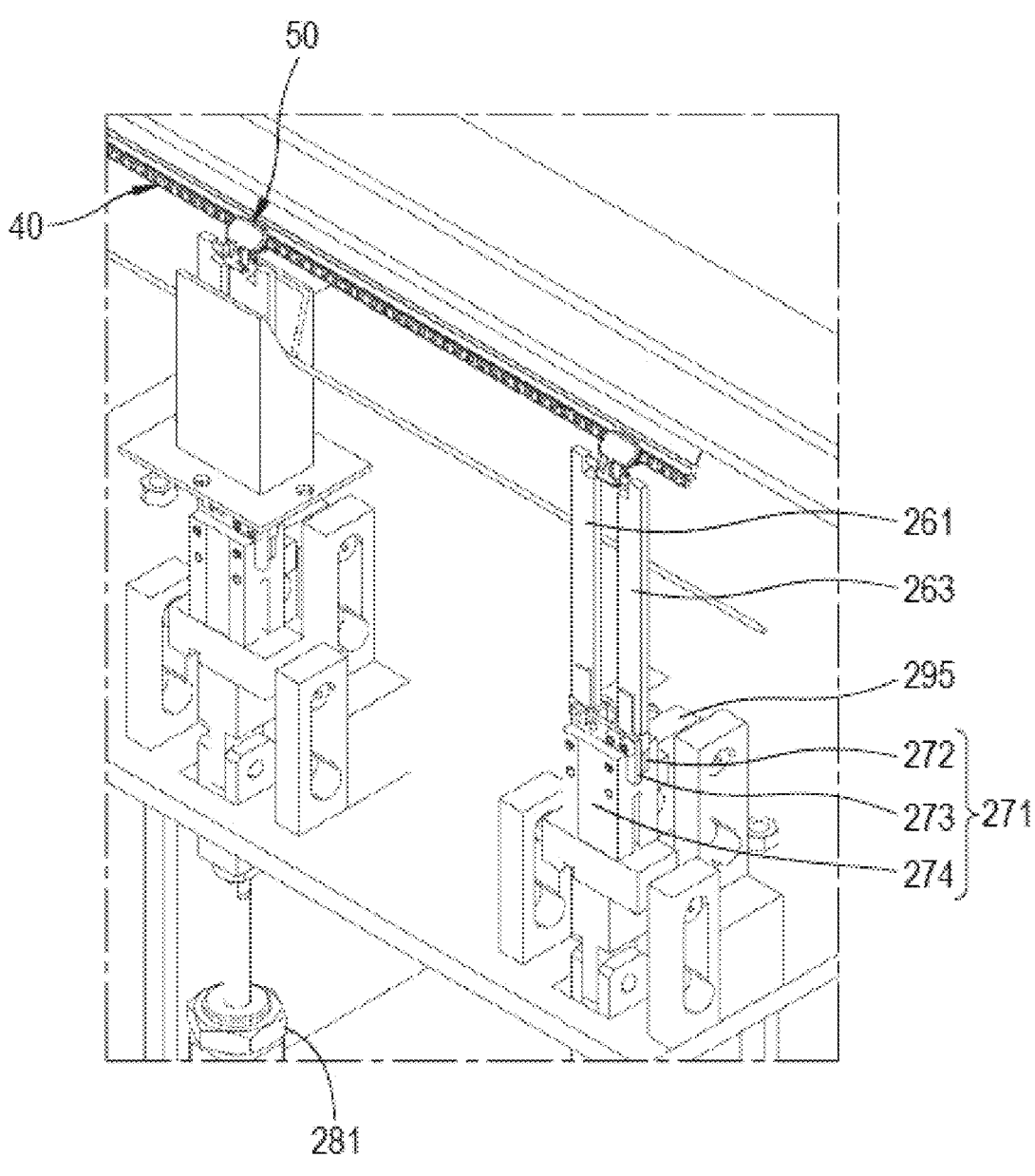

FIG. 26 is a perspective view showing a state in which the grip portion of the cushion operating portion is raised and some blocks are removed.

Figure 27:
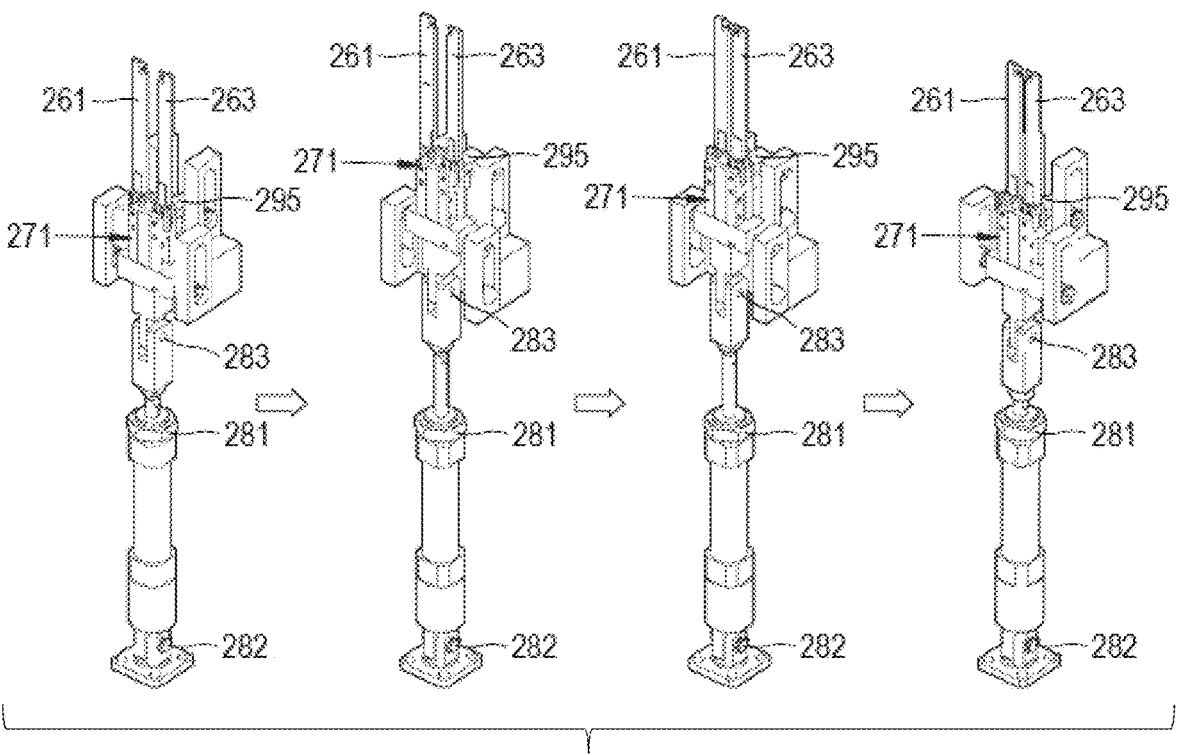

FIG. 27 is a perspective view showing a process in which the grip portion of the cushion operating portion operates.

DESCRIPTION OF EMBODIMENTS

Hereinafter, a preferred embodiment of the present invention will be described in detail with reference to the accompanying drawings.

In the description of the present invention, descriptions of functions or configurations that have already been known are omitted to clarify the gist of the present invention.

X, Y, and Z axes shown in the drawings are freely determined for convenience of description and are not intended to limit the rights, and the X axis indicates directions of a front (arrow side) and a rear (arrow opposite side), the Y axis indicates a left-right direction, and the Z axis indicates an upper-lower direction.

Each direction described below is based on this, unless otherwise specified.

In the description and claims of the present invention, directions such as upper (above), lower (below), right and left (lateral or side), front (fore, forward), and rear (back, rearward) are defined based on the drawings and relative positions between the configurations for convenience of description and are not intended to limit the rights. Each direction described below is based on this, unless otherwise specified.

Referring to FIGS. 1 to 8, a vehicle seat assembly device (10) according to a preferred embodiment of the present invention includes a base portion (100), a cushion operating portion (200) which is coupled to one side of the base portion (100) and in which a seat cushion (20) formed with a plurality of first through holes (21) can be disposed, and a cover operating portion (300) which is coupled to the other side of the base portion (100), in which a seat cover (30) can be disposed, and which can transfer the seat cover (30) onto the seat cushion (20). The cushion operating portion (200) can fix a clip (50) coupled to a suspender (40) of the seat cover (30) to a wire (60) located below the seat cushion (20).

Figure 1:
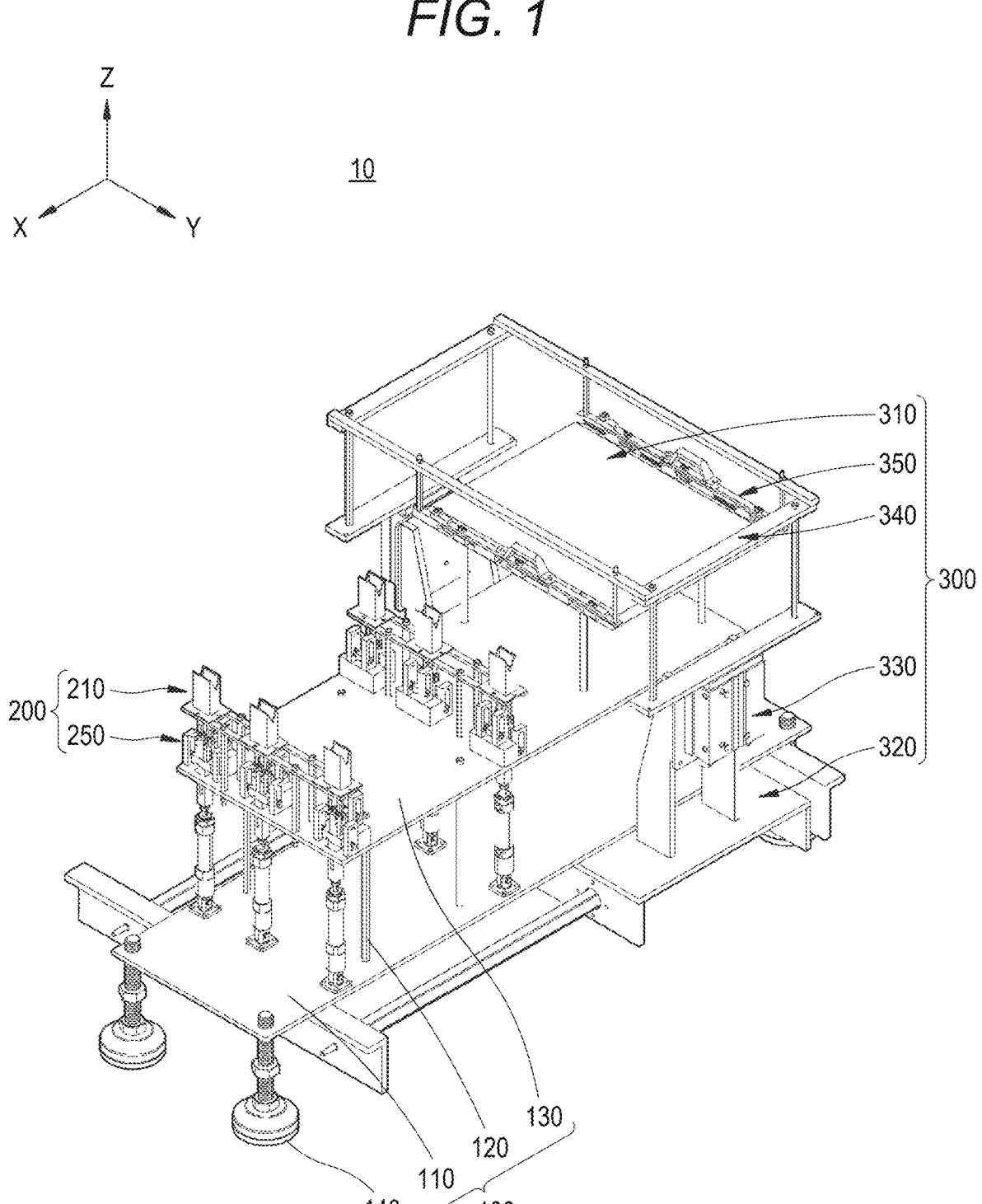
FIG. 1 is a perspective view of a vehicle seat assembly device according to the present invention.
Figure 2:
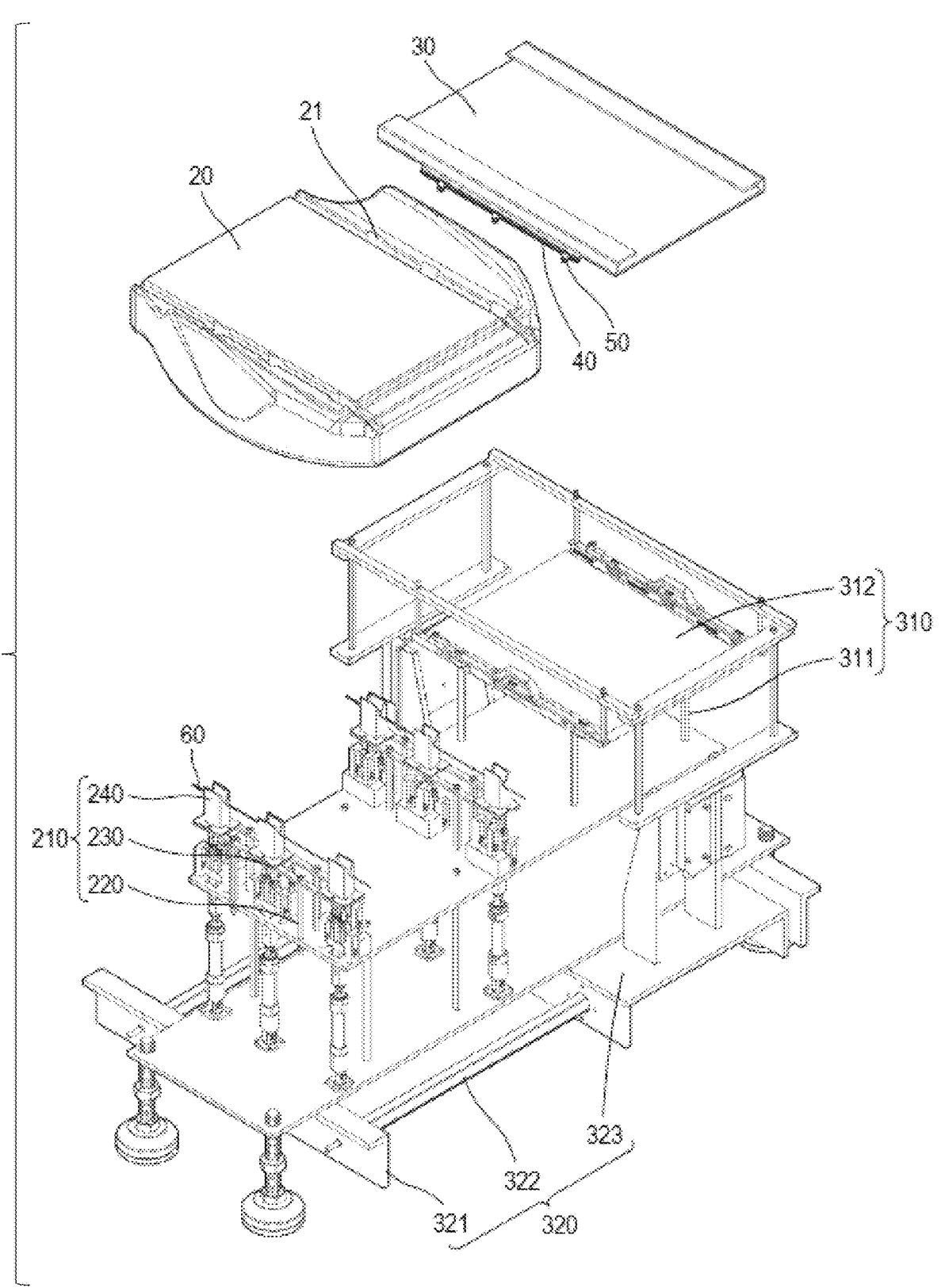
FIG. 2 shows a state in which a wire is disposed in the vehicle seat assembly device of FIG. 1.

Referring to FIG. 2, a plurality of first through holes (21) can be formed in the seat cushion (20).

Figure 9:
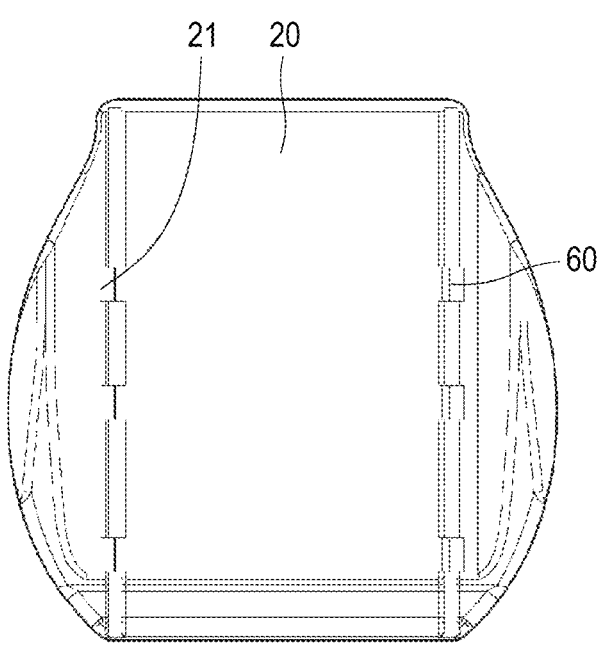
FIG. 9 is a plan view showing the seat cushion and the wire of FIG. 3.

Referring to FIG. 9, the wire (60) disposed below the seat cushion (20) can be exposed through the first through holes (21).

The clip (50) of the seat cover (30) disposed above the seat cushion (20) can be coupled to the wire (60) exposed through the first through hole (21).

A block (240) of the cushion operating portion (200) can be inserted into the first through hole (21).

Referring to FIG. 2, the seat cover (30) can be coupled to the suspender (40) for coupling the clip (50).

Figure 13:
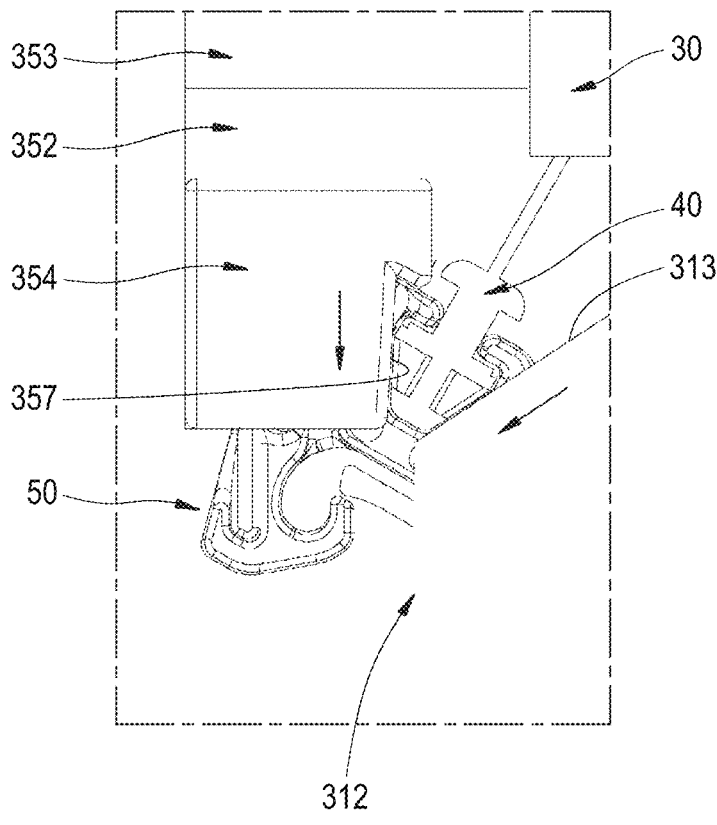
FIG. 13 is a side view showing suspenders coupled to the seat cover and aligned with the cover operating portion of FIG. 12.

Referring to FIG. 13, the suspender (40) connects the seat cover (30) and the clip (50).

Figure 16:
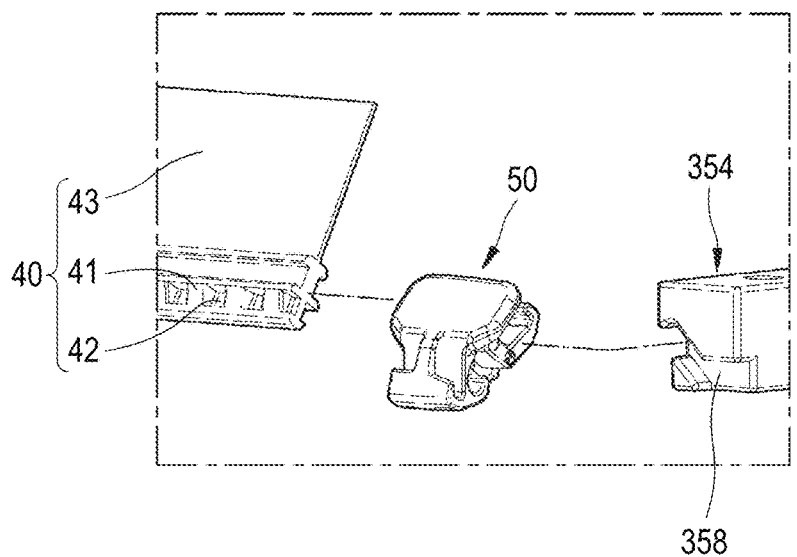
FIG. 16 is a perspective view showing a suspender, the clip, and the clamper.

Referring to FIG. 16, the suspender (40) can include a head portion (41) to which the clip (50) is coupled, and a joint portion (43) coupled to the seat cover (30).

The head portion (41) of the suspender (40) may have a substantially triangular cross section.

The head portion (41) of the suspender (40) may be formed with a plurality of lock grooves (42) into which a lock tab (52) of the clip (50) is inserted.

Figure 15:
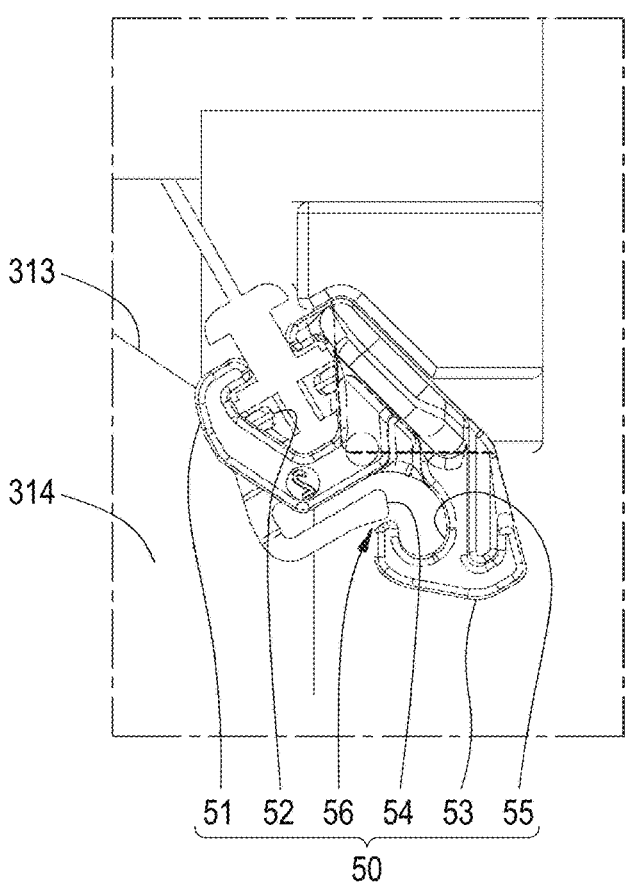
FIG. 15 is a side view showing a state in which a clamper of the cover operating portion of FIG. 12 restricts a clip.

Referring to FIG. 15, the clip (50) may include a lock portion (51) coupled to the suspender (40), a hook portion (53) coupled to the wire (60), and a guide (54) capable of suppressing the wire (60) from coming off.

The lock portion (51) is a part coupled to the head portion (41) of the suspender (40).

The lock portion (51) can be formed with the lock tab (52) to be inserted into the lock grooves (42) formed in the head portion (41) of the suspender (40).

The hook portion (53) can provide a cavity (55) into which the wire (60) is inserted.

An insertion opening (56) through which the wire (60) can enter the cavity (55) may be formed between the hook portion (53) and the guide (54).

The insertion opening (56) may be formed to face downward in a diagonal direction at a predetermined angle so that the wire (60) accommodated in the cavity (55) does not come off downward.

The clip (50) is a component that can move downward in the diagonal direction and be fixed to the wire (60), and a form thereof is not limited.

The clip (50) may be formed into a hook shape so as to be hung on and fixed to the wire (60).

The clip (50) can move downward in the diagonal direction to be hung on and fixed to the wire (60).

The clip (50) fixed to the wire (60) can move in a second through hole (242) formed in the block (240).

Referring to FIG. 2, the wire (60) may be separated from the seat cushion (20) and disposed below the seat cushion (20). Alternatively, the wire (60) may be incorporated in the seat cushion (20) and disposed at a lower part of the seat cushion (20).

The wire (60) may be formed of various materials such as metal, rubber, and synthetic resin.

A cross section of the wire (60) may be formed in various shapes such as a circle, a star shape, or a polygon.

The wire (60) disposed below the seat cushion (20) can be pulled upward by the clip (50) coupled to the suspender (40) of the seat cover (30) disposed above the seat cushion (20).

The wire (60) built in the seat cushion (20) is disposed in a V-shaped groove 241 formed in the block (240) to determine a position of the seat cushion (20).

The wire (60) may refer to a component that is built in the seat cushion (20) and determines the position of the seat cushion (20).

Referring to FIGS. 1 to 8, the base portion (100) can provide a structure in which the cushion operating portion (200) and the cover operating portion (300) are coupled.

The base portion (100) corresponds to a basic framework installed in the bottom portion, and may be formed long in a front-rear direction.

The cushion operating portion (200) may be coupled to a front portion of the base portion (100), and the cover operating portion (300) may be coupled to a rear portion of the base portion (100).

The base portion (100) may include a first plate (110), a plurality of first supporting stands (120) coupled to the top of the first plate (110), and a second plate (130) coupled to the top of the first supporting stands (120).

Referring to FIGS. 1 to 8, the first plate (110) is a plate member installed in parallel and spaced apart from a bottom portion, and a plurality of pedestals (140) can be coupled to the first plate (110).

A transfer portion (320) of the cover operating portion (300) may be coupled to a lower portion of the first plate (110).

The first plate (110) may be coupled to a second frame (321) of the transfer portion (320) at a front lower portion and a rear lower portion thereof while being spaced apart from each other.

The second plate (130) can be disposed above the first plate (110) in parallel and spaced apart from the first plate (110).

The plurality of first supporting stands (120) supporting the second plate (130) can be coupled to the top of the first plate (110).

The first supporting stands (120) may be coupled to the second plate (130) at a top thereof, and may be coupled to the first plate (110) at a bottom thereof.

A fastening portion (250) of the cushion operating portion (200) can be coupled to the top of the first plate (110).

A first lifting portion (280) of the fastening portion (250) can be coupled to the top of the first plate (110).

The first supporting stands (120) can form a space between the first plate (110) and the second plate (130), and a first cylinder (281) of the first lifting portion (280) can be located in the space.

Referring to FIGS. 1 to 8, the second plate (130) is a plate member installed in parallel and spaced apart from the first plate (110), and a cushion placing stand (210) of the cushion operating portion (200) and a cover placing stand (310) of the cover operating portion (300) can be coupled to each other.

The second plate (130) has a front upper portion to which the cushion placing stand (210) can be coupled to a front upper portion of the second plate (130), and the cover placing stand (310) can be coupled to a rear upper portion of the second plate (130).

A plurality of second supporting stands (220) of the cushion placing stand (210) can be coupled to the front upper portion of the second plate (130).

The second plate (130) may be provided with a plurality of third through holes through which the fastening portions (250) can pass in the front.

A guide portion (290) of a coupling portion (270) can be coupled around the third through hole on the second plate (130).

A first guide frame (294) and a second guide frame (298) of the guide portion (290) can be coupled around the third through hole on the second plate (130).

A plurality of third supporting stands (311) of the cover placing stand (310) can be coupled to the rear upper portion of the second plate (130).

Figure 10:
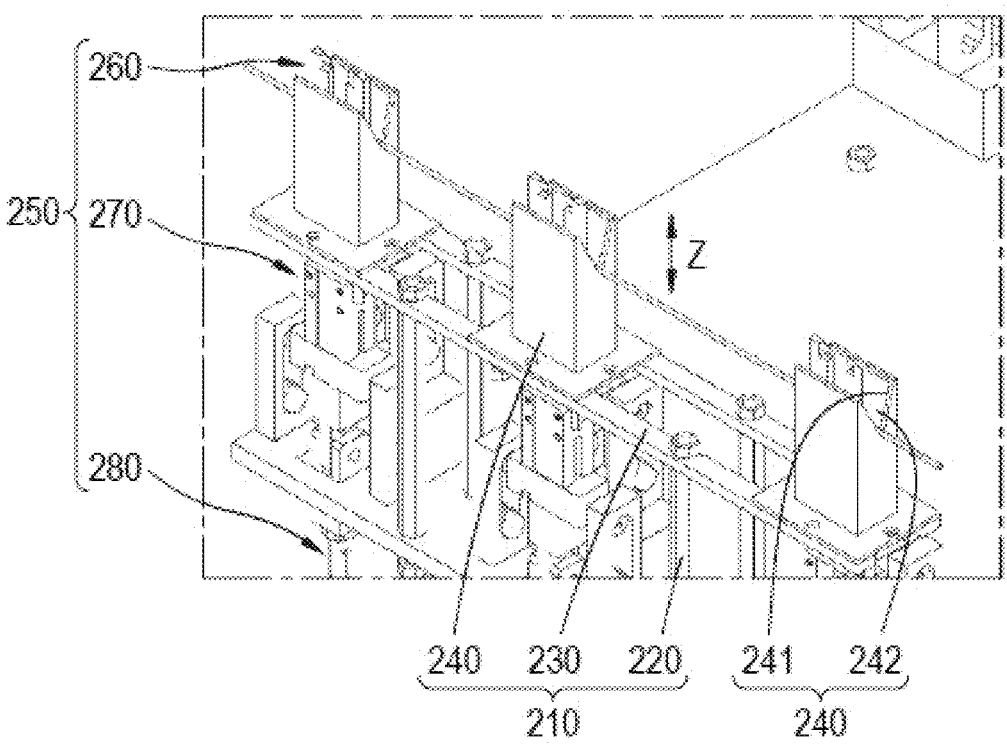
FIG. 10 is an enlarged view showing the cushion operating portion of FIG. 2.
Figure 11:
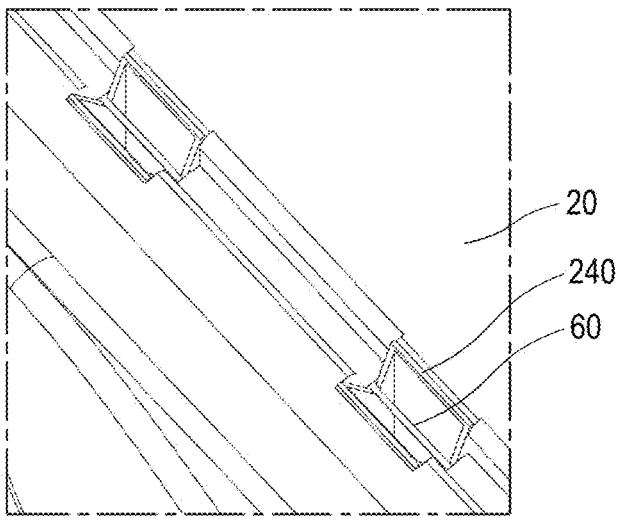
FIG. 11 is an enlarged view showing a part of the seat cushion and the wire of FIG. 3.

Referring to FIGS. 9 to 11, the cushion operating portion (200) is configured such that the seat cushion (20) can be disposed in the front of the base portion (100) for operating.

The cushion operating portion (200) can couple the seat cover (30) transferred by the cover operating portion (300) to the seat cushion (20).

In the cushion operating portion (200), the wire (60) can be first disposed, and the seat cushion (20) can be disposed.

The cushion operating portion (200) can fix the clip (50) of the seat cover (30) disposed on the seat cushion (20) to the wire (60) disposed below the seat cushion (20).

The cushion operating portion (200) may include the cushion placing stand (210) that is coupled to the second plate (130) and on which the seat cushion (20) can be disposed, and the fastening portion (250) that is coupled to the first plate (110) and that can lower the clip (50) into the first through hole (21) and fix the clip (50) to the wire (60).

A plurality of first through holes (21) formed in the seat cushion (20) may be formed at the front and the rear.

Referring to FIGS. 9 to 11, the cushion placing stand (210) may include the plurality of second supporting stands (220) coupled to the second plate (130), a plurality of first frames (230) coupled to the second supporting stands (220) and on which the seat cushion (20) can be disposed, and the plurality of blocks (240) coupled to the first frames (230) and on which the wire (60) can be disposed.

The first frames (230) may be spaced apart from each other in front and rear of the seat cushion (20) so that the seat cushion (20) can be disposed thereon.

The first frame (230) can provide a space in which the fastening portion (250) can move up and down.

An upper portion of the first frame (230) may be coupled to the block (240), and a lower portion of the first frame (230) may be coupled to the second supporting stand (220).

An upper portion of the second supporting stand (220) may be coupled to the first frame (230), and a lower portion of the second supporting stand (220) may be coupled to the second plate (130).

The second supporting stand (220) can form a space between the second plate (130) and the first frame (230), and the coupling portion (270) of the fastening portion (250) can be located in the space.

The block (240) may be formed with a flange whose lower portion extends outward, and the flange may be coupled to the first frame (230).

Referring to FIGS. 9 to 11, the block (240) can be coupled above the first frame (230) to dispose the wire (60).

The seat cushion (20) can be disposed on the first frame (230) in a state where the wire (60) is disposed on the block (240).

The block (240) can be inserted into the first through hole (21) formed in the seat cushion (20) so that the position of the seat cushion (20) can be kept constant.

The block (240) can be inserted into the first through hole (21) of the seat cushion (20) in a state where the wire (60) is disposed.

When the block (240) is inserted into the first through hole (21) of the seat cushion (20), the seat cushion (20) can be suppressed from shaking.

A V-shaped groove (241) may be formed in an upper portion of the block (240) so that the position of the wire (60) can be maintained constant.

When the V-shaped groove (241) is formed in the block (240), the wire (60) can be positioned below the V-shaped groove (241) by gravity.

The block (240) may have the second through hole (242) formed therein so that the fastening portion (250) can move up and down.

When the second through hole (242) is formed in the block (240), a grip portion (260) of the fastening portion (250) capable of restricting the clip (50) of the seat cover (30) can move up and down in the block (240).

The V-shaped groove (241) formed in the block (240) may be formed asymmetrically in the left-right direction.

When the V-shaped groove (241) is formed asymmetrically in the block (240), the second through hole (242) is formed larger on a side where the inclination of the V-shaped groove (241) is low; and the grip portion (260) can move up and down to the second through hole (242) located on the side where the inclination of the V-shaped groove (241) is low.

Figure 17:
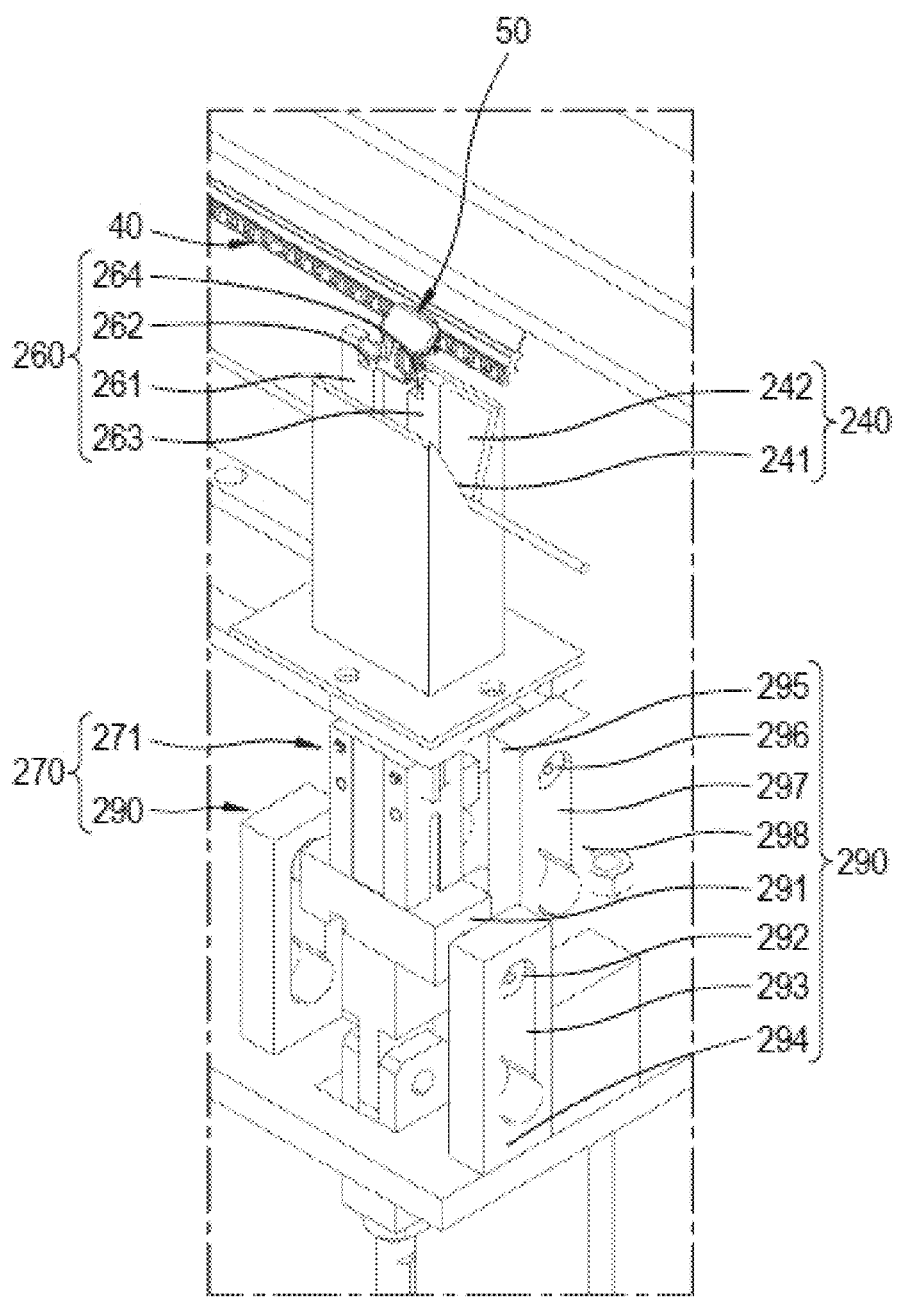
FIG. 17 is a perspective view showing a state in which a grip portion of the cushion operating portion is raised.
Figure 18:
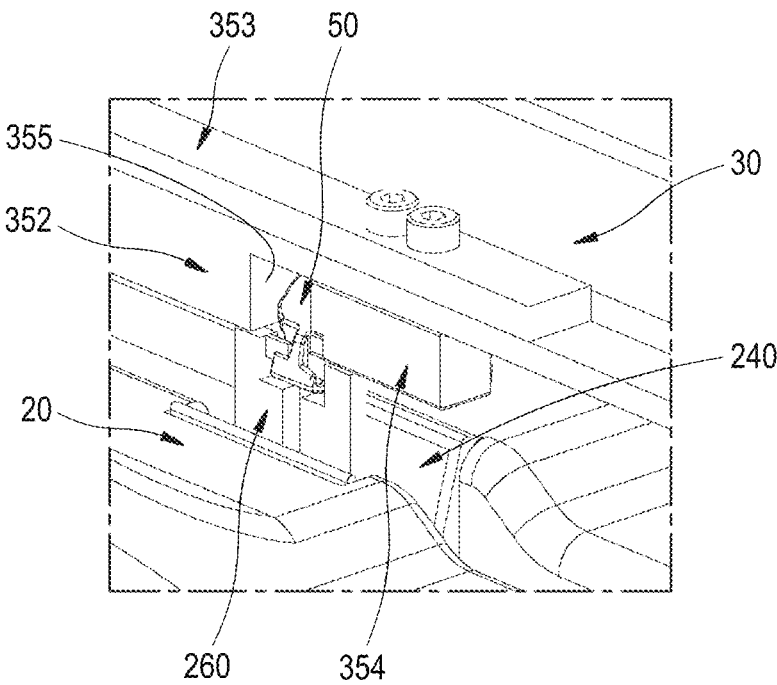
FIG. 18 is a perspective view showing a state in which the clamper of the cover operating portion and the grip portion of the cushion operating portion restrict the clip.
Figure 19:
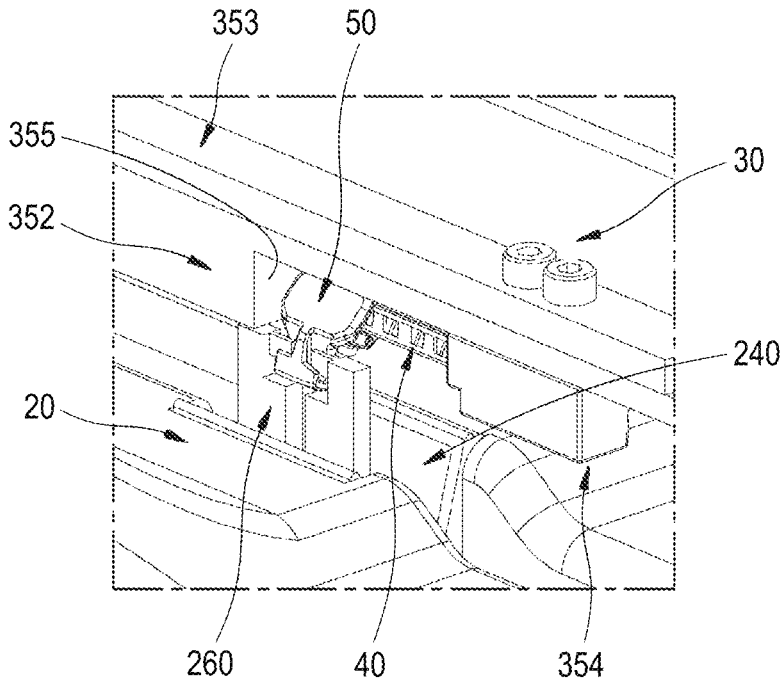
FIG. 19 shows a state in which the clamper of the cover operating portion releases the restriction of the clip in FIG. 18.

Referring to FIGS. 17 to 19, the fastening portion (250) can lower the clip (50) of the seat cover (30) disposed on the seat cushion (20) by the cover operating portion (300) and can fasten the clip (50) to the wire (60) disposed below the seat cushion (20).

The fastening portion (250) is coupled to the first plate (110), and can move up and down through the first through hole (21) formed in the seat cushion (20), the second through hole (242) formed in the block (240), and the third through hole formed in the second plate (130).

The fastening portion (250) may include the grip portion (260) capable of restricting the clip (50), the coupling portion (270) coupled to the grip portion (260) and capable of actuating the grip portion (260), and the first lifting portion (280) coupled to the coupling portion (270).

Referring to FIGS. 26 and 27, the grip portion (260) can restrict the clip (50) of the seat cover (30) which is disposed on the seat cushion (20) by the cover operating portion (300).

The grip portion (260) may include a first grip bar (261) formed with a first grip groove (262), and a second grip bar (263) formed with a second grip groove (264) facing the first grip groove (262).

The first grip groove (262) of the first grip bar (261) and the second grip groove (264) of the second grip bar (263) can restrict the clip (50).

The first grip bar (261) and the second grip bar (263) may be disposed parallel to each other and spaced apart in a vertical direction.

When a distance between the first grip bar (261) and the second grip bar (263) is narrowed, the first grip groove (262) and the second grip groove (264) can restrict the clip (50).

In order to restrict the clip (50), the first grip bar (261) and the second grip bar (263) can move up and down through the first through hole (21) formed in the seat cushion (20) and the second through hole (242) formed in the block (240).

When the V-shaped groove (241) formed in the block (240) is asymmetrical in the left-right direction, the grip portion (260) can move up and down to the second through hole (242) located on the side where the inclination of the V-shaped groove (241) is low with respect to the wire (60) disposed in the V-shaped groove (241).

The first grip bar (261) and the second grip bar (263) can be coupled to the coupling portion (270) located at a lower portion.

Referring to FIGS. 17 to 19, the coupling portion (270) can operate the grip portion (260) to restrict the clip (50).

The coupling portion (270) may include a drive portion (271) capable of adjusting the distance between the first grip bar (261) and the second grip bar (263).

The drive portion (271) may include a first assembly (272) coupled to a lower portion of the first grip bar (261), a second assembly (273) coupled to a lower portion of the second grip bar (263), and a drive main body (274) to which the first assembly (272) and the second assembly (273) are movably coupled.

The first assembly (272) and the second assembly (273) can be coupled to the drive main body (274) in parallel with and spaced apart from each other.

The first assembly (272) and the second assembly (273) may be slidably coupled to the drive main body (274).

When the first assembly (272) and the second assembly (273) move toward the inside of the drive main body (274), the distance between the first grip bar (261) and the second grip bar (263) decreases, and the clip (50) can be restricted.

When the first assembly (272) and the second assembly (273) move toward the outside of the drive main body (274), the distance between the first grip bar (261) and the second grip bar (263) increases, and the clip (50) can be released from the restriction.

The drive main body (274) can slide the first assembly (272) and the second assembly (273) in parallel.

The drive main body (274) may include a driving device capable of operating the first assembly (272) and the second assembly (273).

The driving device may include a gear, a cam, a link, and the like that are operated by a pneumatic pressure, a hydraulic pressure, or electricity.

The driving device can be operated by the first cylinder (281) of the first lifting portion (280).

Referring to FIGS. 17 to 19, the coupling portion (270) can guide the clip (50) to be fixed to the wire (60) by moving the grip portion (260) up and down.

The coupling portion (270) may include the guide portion (290) that guides the grip portion (260) in a direction in which the grip portion (260) moves up and down.

The guide portion (290) may include a first guide main body (291) coupled between the drive main body (274) and the first lifting portion (280), a first guide bar (292) coupled to both sides of the first guide main body (291), and the first guide frame (294) coupled to the second plate (130) and having a first guide rail (293) into which the first guide bar (292) is inserted formed in the upper-lower direction.

The first guide main body (291) can be coupled between the drive main body (274) and a cylinder and can be moved up and down.

The first guide main body (291) can be coupled to the first lifting portion (280) by a second hinge (283).

The first lifting portion (280) may include the first cylinder (281) capable of moving up and down the coupling portion (270) coupled to an upper portion of the first lifting portion (280).

The first lifting portion (280) can move up and down the grip portion (260) coupled to an upper portion of the coupling portion (270).

The first guide bar (292) that move along the first guide rail (293) can be coupled to the first guide main body (291) on both sides.

A wheel moving along the first guide rail (293) can be coupled to the first guide bar (292).

Since the first guide main body (291) moves up and down along an up-down path of the first guide bar (292), the grip portion (260) can also move up and down.

A pair of first guide frames (294) can be disposed on both sides of the first guide main body (291) so as to be spaced apart from each other.

The first guide frame (294) can be provided with the first guide rail (293) that determines the up-down path of the first guide bar (292).

The first guide rail (293) is formed in a longitudinal direction, and a lower portion thereof can be formed to be bent in a diagonal direction.

When the lower portion of the first guide rail (293) is formed to be bent in the diagonal direction, the first guide bar (292) can be lowered in the diagonal direction at the lower portion of the first guide rail (293).

Figure 22:
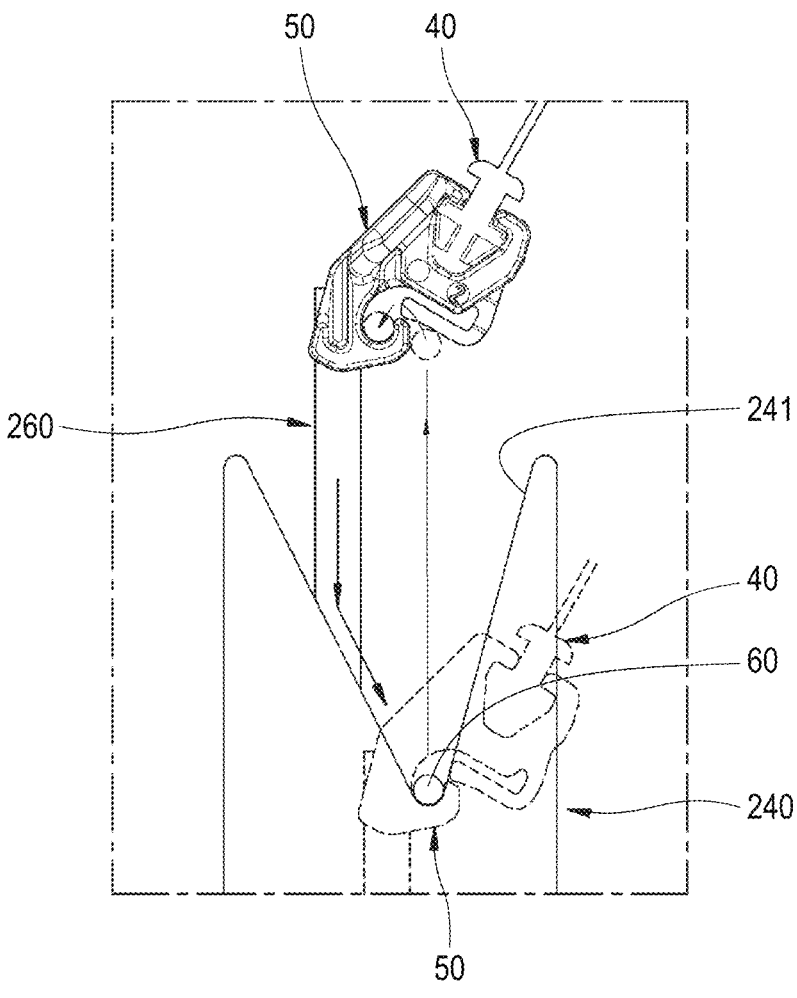
FIG. 22 is a side view showing that the grip portion of the cushion operating portion lowers the clip and fixes the clip to the wire.

Referring to FIG. 22, when the first guide bar (292) is lowered in the diagonal direction at the lower portion of the first guide rail (293), the insertion opening (56) of the cavity (55) formed in a lower portion of the clip (50) can move in a direction of the wire (60) disposed in the V-shaped groove (241) of the block (240), so that the wire (60) can be accommodated in the cavity (55) of the clip (50) through the insertion opening (56) of the cavity (55).

Referring to FIGS. 17 to 19, the guide portion (290) may include a second guide main body (295) coupled to the drive main body (274), a second guide bar (296) coupled to both sides of the second guide main body (295) in the same direction as the first guide bar (292), and the second guide frame (298) coupled to the second plate (130) and having a second guide rail (297) into which the second guide bar (296) is inserted formed in the upper-lower direction.

The second guide main body (295) can be coupled to the drive main body (274) and can be moved up and down.

The second guide main body (295) may be coupled to the drive main body (274) at a height different from that of the first guide main body (291).

The second guide bar (296) that move along the second guide rail (297) can be coupled to the second guide main body (295) on both sides.

A wheel moving along the second guide rail (297) can be coupled to the second guide bar (296).

Since the second guide main body (295) moves up and down along an up-down path of the second guide bar (296), the grip portion (260) can also move up and down.

A pair of second guide frames (298) can be disposed on both sides of the second guide main body (295) so as to be spaced apart from each other.

The second guide frame (298) can be provided with the second guide rail (297) that determines the up-down path of the second guide bar (296).

The second guide rail (297) can be formed in the same direction as the first guide rail (293).

The second guide rail (297) is formed in a longitudinal direction, and a lower portion thereof can be formed to be bent in a diagonal direction.

When the lower portion of the second guide rail (297) is formed to be bent in the diagonal direction, the second guide bar (296) can be lowered in the diagonal direction at the lower portion of the second guide rail (297).

Referring to FIG. 22, when the second guide bar (296) is lowered in the diagonal direction at the lower portion of the second guide rail (297), the insertion opening (56) of the cavity (55) formed in a lower portion of the clip (50) can move in a direction of the wire (60) disposed in the V-shaped groove (241) of the block (240), so that the wire (60) can be accommodated in the cavity (55) of the clip (50) through the insertion opening (56) of the cavity (55).

Since the guide portion (290) can include the first guide rail (293) and the second guide rail (297), an up-down path of the drive portion (271) can be stably maintained.

The first lifting portion (280) can be coupled to the first plate (110) by a first hinge (282), and can be coupled to the first guide main body (291) by the second hinge (283), so that when the first guide bar (292) and the second guide bar (296) are lowered in the diagonal direction, the first lifting portion (280) can be inclined and can be suppressed from being damaged.

Referring to FIGS. 1 to 8, the cover operating portion (300) is configured such that the seat cover (30) is disposed on the rear of the base portion (100) and can be transferred.

The cover operating portion (300) can dispose the seat cover (30) and transfer the seat cover (30) onto the seat cushion (20).

The cover operating portion (300) can align an angle of the clips (50) coupled to the suspender (40) of the seat cover (30).

The cover operating portion (300) may include the cover placing stand (310) that is coupled to the second plate (130) and on which the seat cover (30) can be disposed, the transfer portion (320) that is coupled to the first plate (110) and can reciprocate between one side and the other side of the first plate (110), a second lifting portion (330) that is coupled to the transfer portion (320), a support portion (340) that is coupled to the second lifting portion (330), and a holder (350) that is coupled to the support portion (340) and can restrict the clip (50).

Referring to FIGS. 1 to 8, the cover placing stand (310) can be preferentially disposed before the seat cover (30) is transferred.

The cover placing stand (310) may include the plurality of third supporting stands (311) coupled to the second plate (130) and a first table (312) coupled to the third supporting stands (311) and on which the seat cover (30) can be disposed.

An upper portion of the third supporting stand (311) may be coupled to the first table (312), and a lower portion of the third supporting stand (311) may be coupled to the second plate (130).

The first table (312) can provide a work table for disposing the seat cover (30). Referring to FIG. 13, the first table (312) may have a first inclined surface (313) to come into contact with the head portion (41) of the suspender (40).

The first inclined surface (313) formed on the first table (312) can be aligned while being in contact with the head portion (41) of the suspender (40).

The suspender (40) can be aligned while the head portion (41) is in contact with the first inclined surface (313) formed on the first table (312) and the second inclined surface formed on a sixth frame (352).

The first inclined surface (313) of the first table (312) can come into contact with the head portion (41) of the suspender (40) on a lower side, and the second inclined surface formed on the sixth frame (352) can come into contact with the head portion (41) on an upper side.

Referring to FIG. 15, in the first table (312), a plurality of accommodating grooves (314) in which the clip (50) is located and can move, may be formed in the first inclined surface (313).

The accommodating groove (314) formed in the first inclined surface (313) of the first table (312) can provide a space in which the clip (50) is accommodated and can move.

Referring to FIGS. 1 to 8, the cover operating portion (300) may include the transfer portion (320) capable of moving the seat cover (30) above the seat cushion (20).

The transfer portion (320) can reciprocate between a front side and a rear side of the base portion (100).

The transfer portion (320) may include a pair of second frames (321) coupled to the first plate (110), a plurality of shafts (322) coupled in parallel between the second frames (321), and a second table (323) coupled to the shafts (322) and capable of reciprocating between the second frames (321).

The second frame (321) is a portion for supporting the shaft (322).

The second frame (321) can be coupled to a front lower portion and a rear lower portion of the first plate (110).

The shaft (322) can provide a path along which the second table (323) reciprocates in the front-rear direction.

The shaft (322) may be coupled to the second frame (321) in parallel in the front-rear direction.

The second table (323) is a portion that moves in the front-rear direction along the shaft (322).

The second lifting portion (330) may be coupled to an upper portion of the second table (323).

When the second table (323) moves, the support portion (340) coupled to the second lifting portion (330) and the holder (350) coupled to the support portion (340) can move together.

Referring to FIGS. 1 to 8, the cover operating portion (300) may include the second lifting portion (330) capable of moving the seat cover (30) up and down.

An upper portion of the second lifting portion (330) may be coupled to the support portion (340) and a lower portion of the second lifting portion (330) may be coupled to the second table (323).

The second lifting portion (330) can move up and down the support portion (340) coupled to the upper portion thereof and the holder (350) coupled to the support portion (340).

The second lifting portion (330) may include a plurality of fourth supporting stands (331) coupled to the second table (323) and a plurality of second cylinders (332) coupled to the fourth supporting stands (331) spaced apart from each other with respect to the first plate (110).

The fourth supporting stand (331) and the second cylinder (332) can be located on the left and right of the first plate (110), respectively.

Referring to FIGS. 1 to 8, the cover operating portion (300) may include the support portion (340) connecting the holder (350) and the second lifting portion (330).

The support portion (340) may include a pair of third frames (341) coupled to the second cylinder (332), a pair of fifth supporting stands (342) coupled to the third frame (341), a pair of fourth frames (343) coupled to the fifth supporting stand (342), and a pair of fifth frames (344) respectively coupled to one side and the other side of the fourth frame (343).

The third frame (341) may be coupled to a portion corresponding to a lower portion of the support portion (340) and to an upper portion of the second cylinder (332).

The fifth supporting stand (342) is a portion that supports the fourth frame (343) spaced apart from the third frame (341) and disposed in parallel to the third frame (341) above the third frame (341).

The fourth frame (343) is a portion that supports the fifth frame (344) to which the holder (350) is connected.

The fourth frames (343) can form a rectangular frame having a frame shape together with the fifth frames (344).

Referring to FIGS. 1 to 8, the cover operating portion (300) may include the holder (350) capable of restricting the clip (50) of the seat cover (30).

Figure 12:
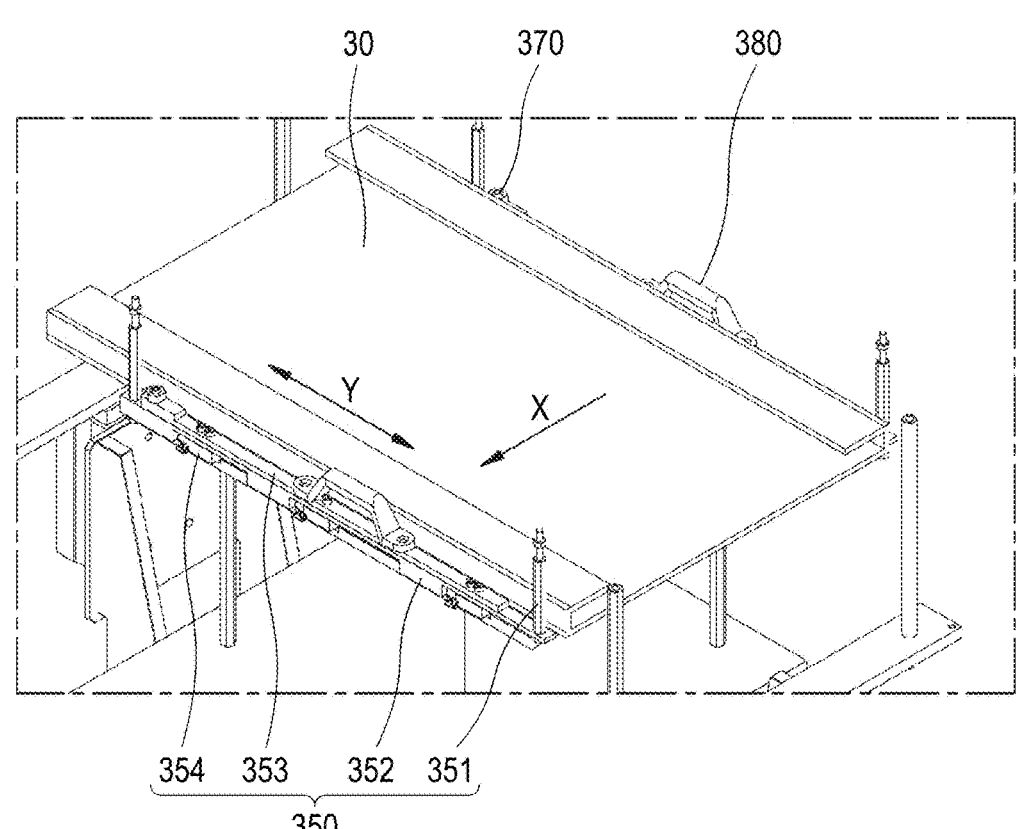
FIG. 12 is an enlarged view showing the cover operating portion of FIG. 4.

Referring to FIG. 12, the holder (350) can align the angle of the clips (50) coupled to the suspender (40) of the seat cover (30).

The holder (350) may include a plurality of sixth supporting stands (351) coupled to one side and the other side of the support portion (340), a pair of sixth frames (352) coupled to a lower portion of the sixth supporting stands (351) and having a plurality of movement grooves (355) formed in a lower portion in the longitudinal direction, a pair of seventh frames (353) coupled to an upper portion of the sixth frames (352) and movable in the longitudinal direction, and a plurality of clampers (354) located in the movement grooves (355) and coupled to the seventh frames (353).

When the holder (350) moves the seventh frame (353), the clamper (354) can restrict the clip (50) positioned in the movement groove (355).

Figure 14:
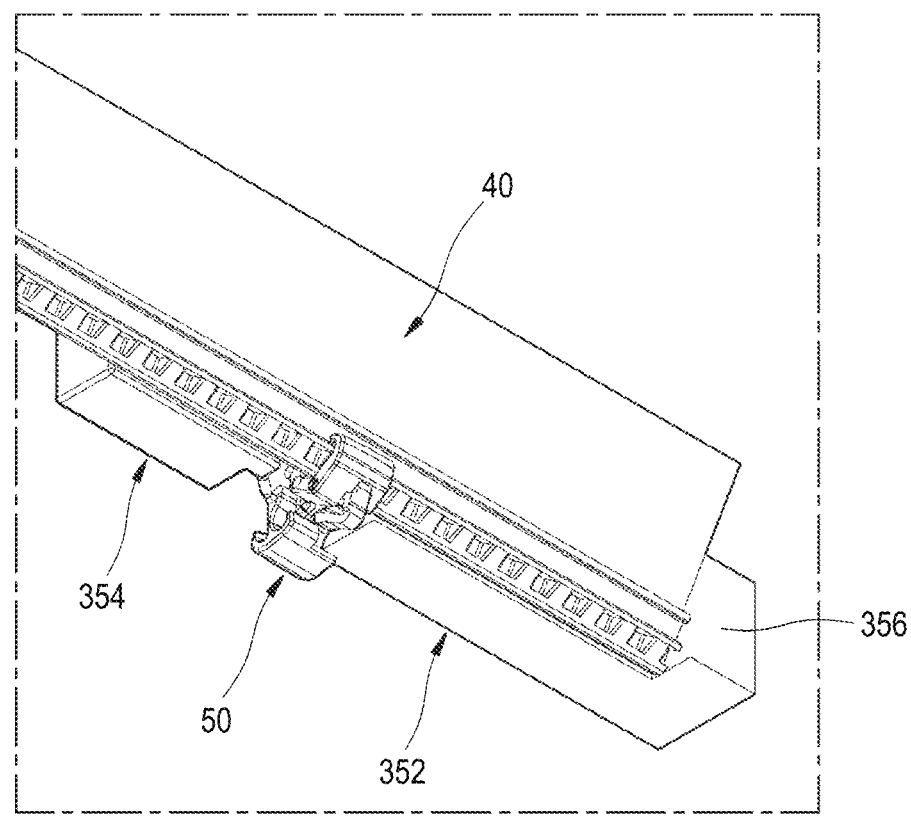
FIG. 14 is a perspective view of a stopper of the cover operating portion of FIG. 12 as viewed from the bottom.

Referring to FIGS. 13 to 15, the sixth supporting stand (351) is a portion that supports the sixth frame (352)

disposed in parallel to a lower portion of the fifth frame (344) of the supporting stand with a space therebetween.

An upper portion of the sixth supporting stand (351) may be coupled to the fifth frame (344) of the support portion (340), and a lower portion of the sixth supporting stand (351) may be coupled to the sixth frame (352).

Referring to FIGS. 13 to 15, the sixth frame (352) may have a rod shape and may be disposed in line with the suspender (40).

The sixth frame (352) can align the head portion (41) of the suspender (40) with the first table (312).

The sixth frame (352) can form a second inclined surface that is aligned with and in contact with the head portion (41) of the suspender (40).

The movement groove (355) in which the clamper (354) can be accommodated and moved may be formed in a lower portion of the sixth frame (352).

The sixth frame (352) may have a plurality of fourth through holes elongated in the left-right direction so that a bolt or the like connecting the seventh frame (353) and the clamper (354) can move.

A stopper (356) may be formed at one end of the sixth frame (352) in the longitudinal direction.

The stopper (356) may be formed on an end portion of the sixth frame (352) positioned in the direction in which the clamper (354) moves in order to align or restrict the clips (50).

When the clamper (354) moves the clip (50), the stopper (356) can limit a moving distance of the suspender (40) which moves together.

The stopper (356) can suppress the suspender (40) from protruding in the direction in which the clamper (354) moves in order to align or restrict the clips (50).

Figure 20:
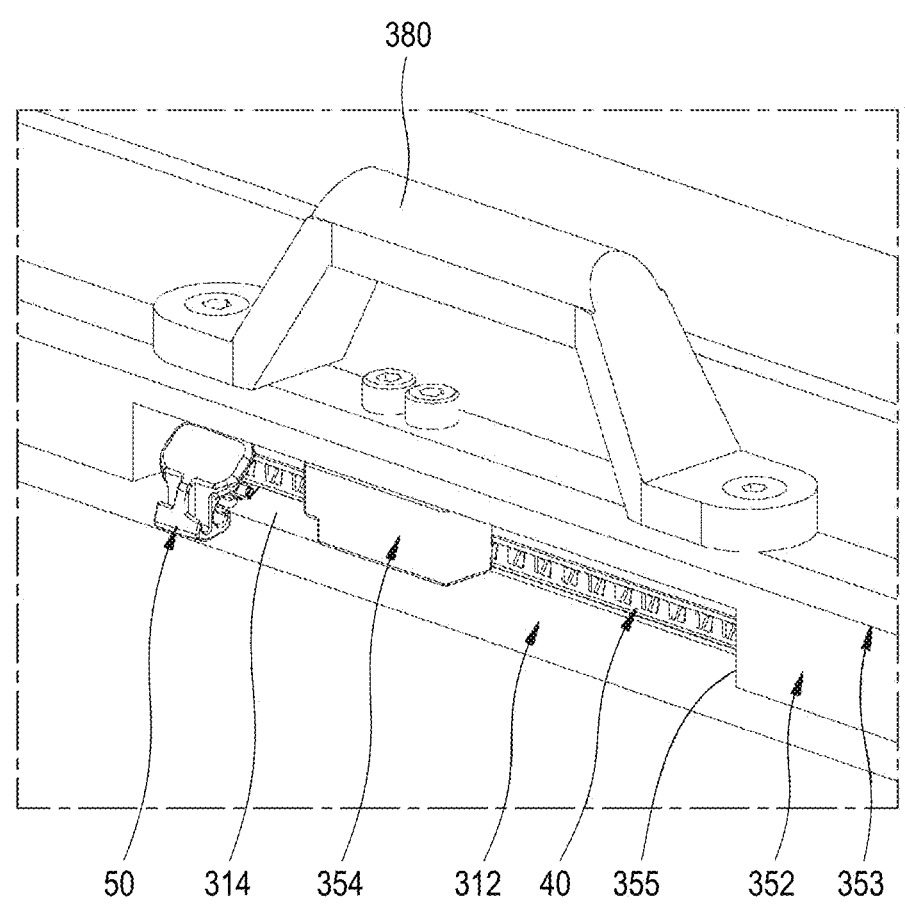
FIG. 20 is a perspective view showing a state in which the clamper of the cover operating portion does not restrict the clip.
Figure 21:
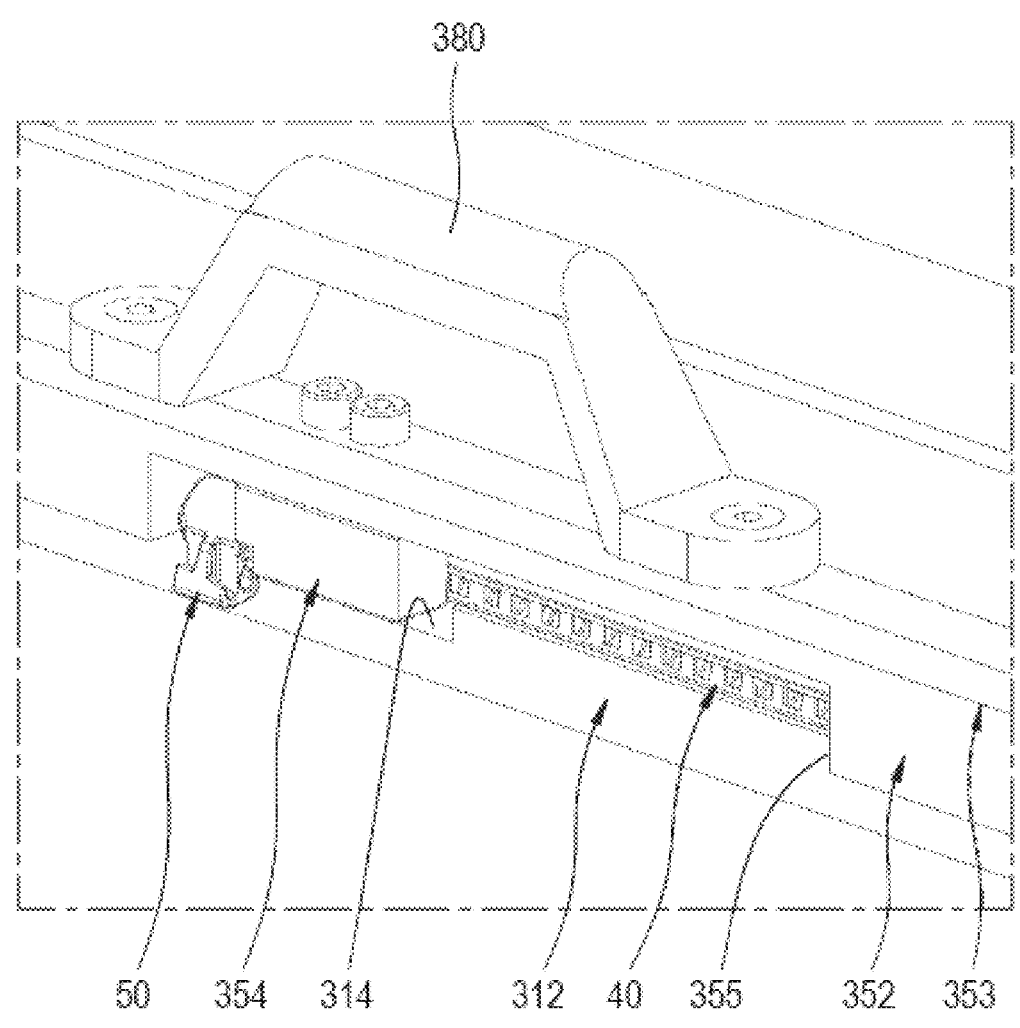
FIG. 21 is a perspective view showing a state in which the clamper of the cover operating portion restricts the clip.

Referring to FIGS. 20 to 22, the seventh frame (353) is coupled to the upper portion of the sixth frame (352) and can slide in the left-right direction.

The seventh frame (353) can be coupled to the clamper (354) located in the movement groove (355) of the sixth frame (352) by a bolt or the like.

A handle 380 can be coupled to an upper portion of the seventh frame 353.

When the seventh frame (353) is moved with respect to the sixth frame (352), the clamper (354) can be moved together.

The seventh frame (353) can move the clamper (354) to align the clips (50).

The seventh frame (353) can move the clamper (354) to restrict the clips (50).

The seventh frame (353) may include a fixture (370) that can be fixed to the sixth frame (352).

The fixture (370) can maintain a position to which the seventh frame (353) is moved with respect to the sixth frame (352).

The fixture (370) can cause the clamper (354) moving with the seventh frame (353) to maintain the restriction of the clip (50).

The seventh frame (353) can use the fixture (370) to maintain the position after moving the clamper (354) in order to align or restrict the clips (50).

A ball plunger or a bolt can be used as the fixture (370).

Referring to FIGS. 20 and 21, the clamper (354) can align or restrict the clips (50).

The clamper (354) can be coupled to the seventh frame (353) to move together.

The clamper (354) can move inside the movement groove (355) of the sixth frame (352).

Referring to FIG. 13, the clamper (354) may have a first insertion groove (357) to come into contact with the head portion (41) of the suspender (40).

The first insertion groove (357) of the clamper (354) can come into contact with an upper portion of the head portion (41) of the suspender (40) together with the second inclined surface of the sixth frame (352).

Referring to FIG. 16, the clamper (354) may have a second insertion groove (358) into which a part of the clip (50) is inserted so that the clip (50) can be restricted.

Referring to FIGS. 2 to 8, a process of coupling the seat cover (30) to the seat cushion (20) is as follows.

(1) First Step

As shown in FIG. 2, the wire (60) is disposed in the blocks (240) of the cushion operating portion (200).

At this time, the V-shaped groove (241) of the block (240) can suppress the wire (60) from moving.

(2) Second Step

Figure 3:
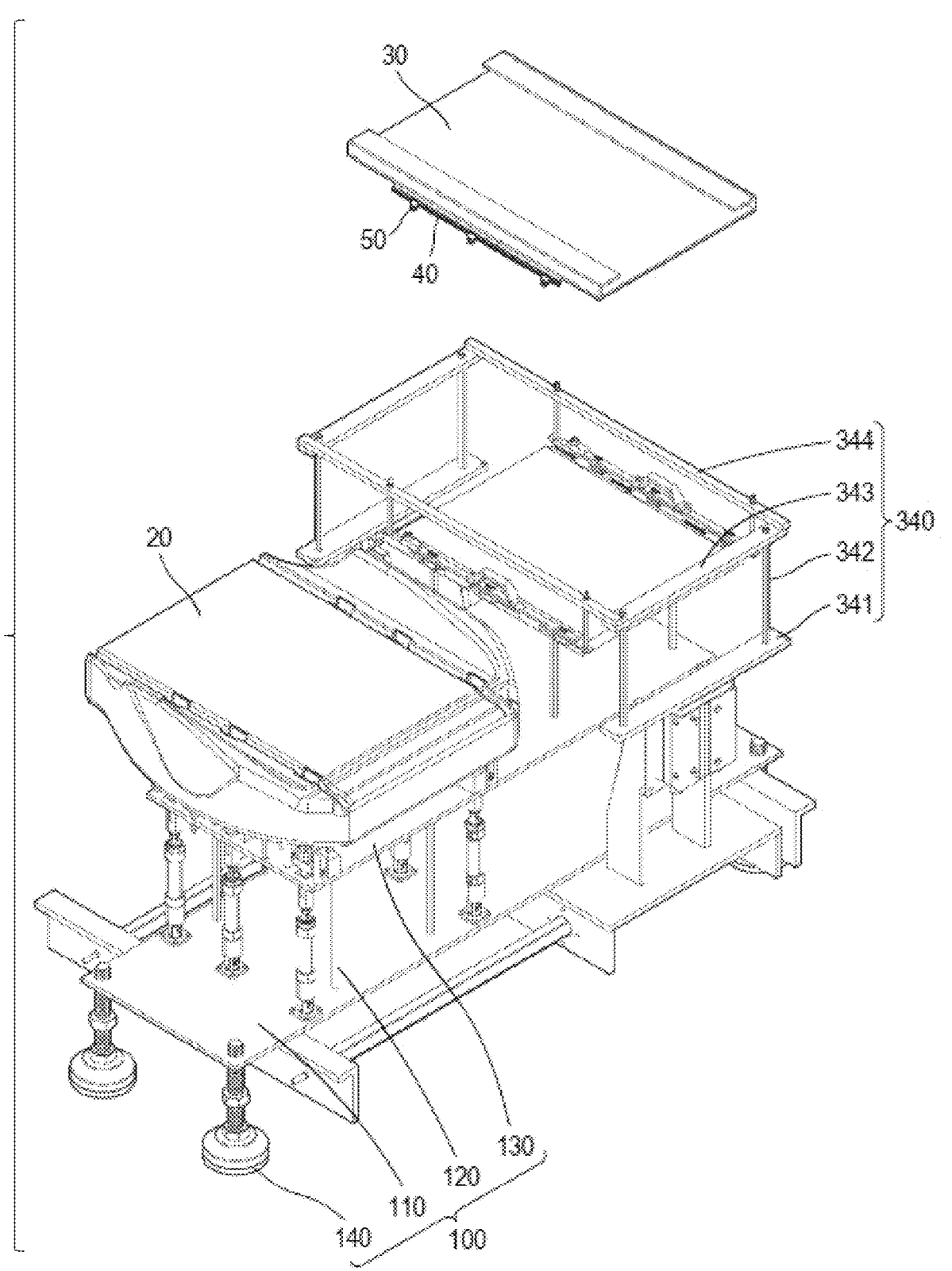
FIG. 3 shows a state in which a seat cushion is disposed in the vehicle seat assembly device of FIG. 2.

As shown in FIG. 3, the seat cushion (20) is disposed on the wire (60).

That is, in a state where the wire (60) is disposed on the blocks (240), the seat cushion (20) is disposed on the cushion placing stand (210) of the cushion operating portion (200).

At this time, the block (240) is inserted into the first through hole (21) of the seat cushion (20), and the seat cushion (20) can be suppressed from moving.

(3) Third Step

Figure 4:
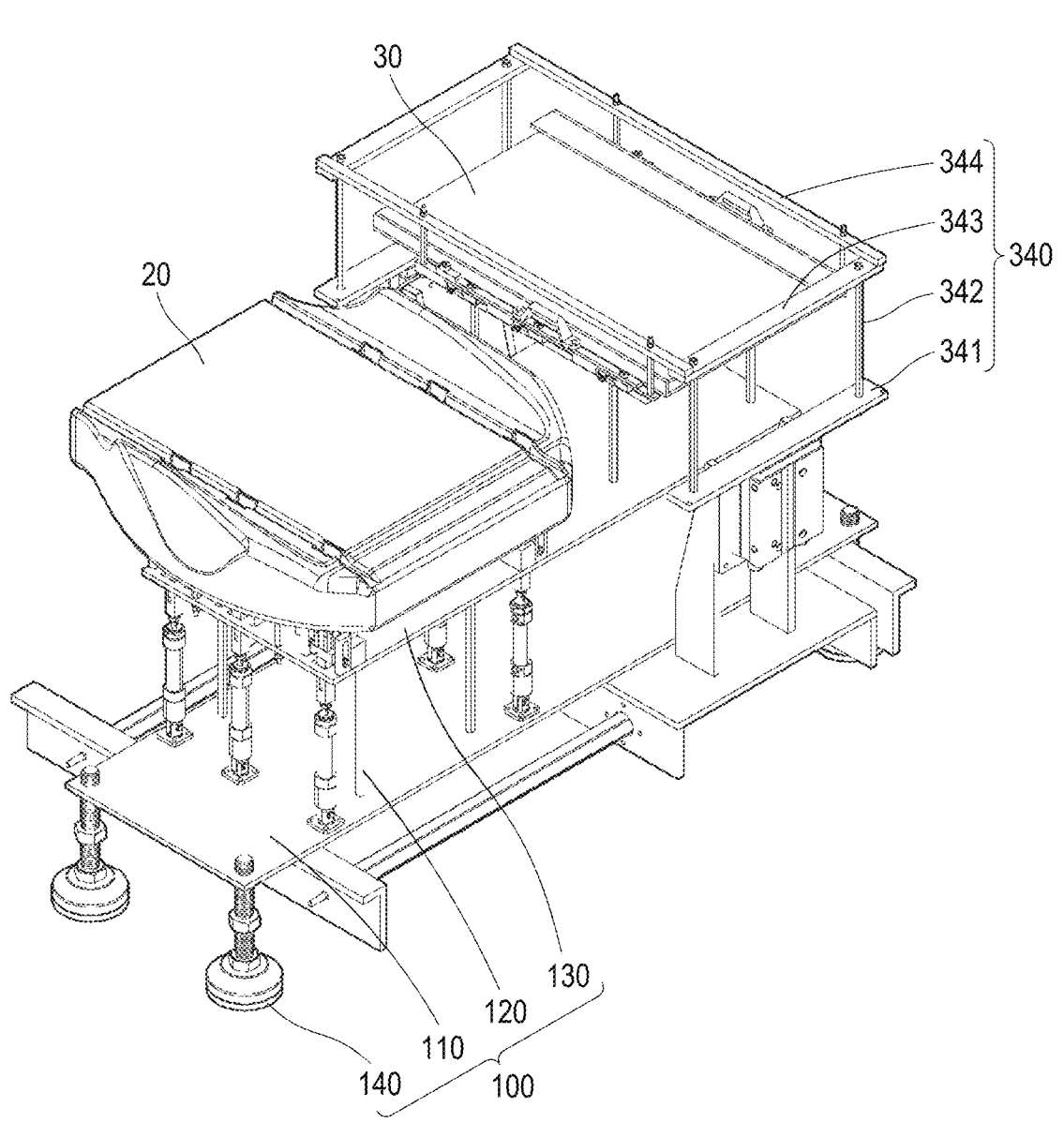
FIG. 4 shows a state in which a seat cover is disposed in the vehicle seat assembly device of FIG. 3.

After the seat cover (30) is disposed on the cover placing stand (310) of the cover operating portion (300) as shown in FIG. 4 and the clips (50) are aligned and restricted as shown in FIG. 12, the position of the clamper (354) is fixed with the fixture (370).

That is, as shown in FIG. 13, the head portion (41) of the suspender (40) is pushed so as to come into contact with the first inclined surface (313) of the first table (312) and the second inclined surface of the sixth frame (352) to align the angle of the clips (50), and as shown in FIGS. 20 and 21, the clamper (354) is pushed to restrict the clips (50).

(4) Fourth Step

Figure 5:
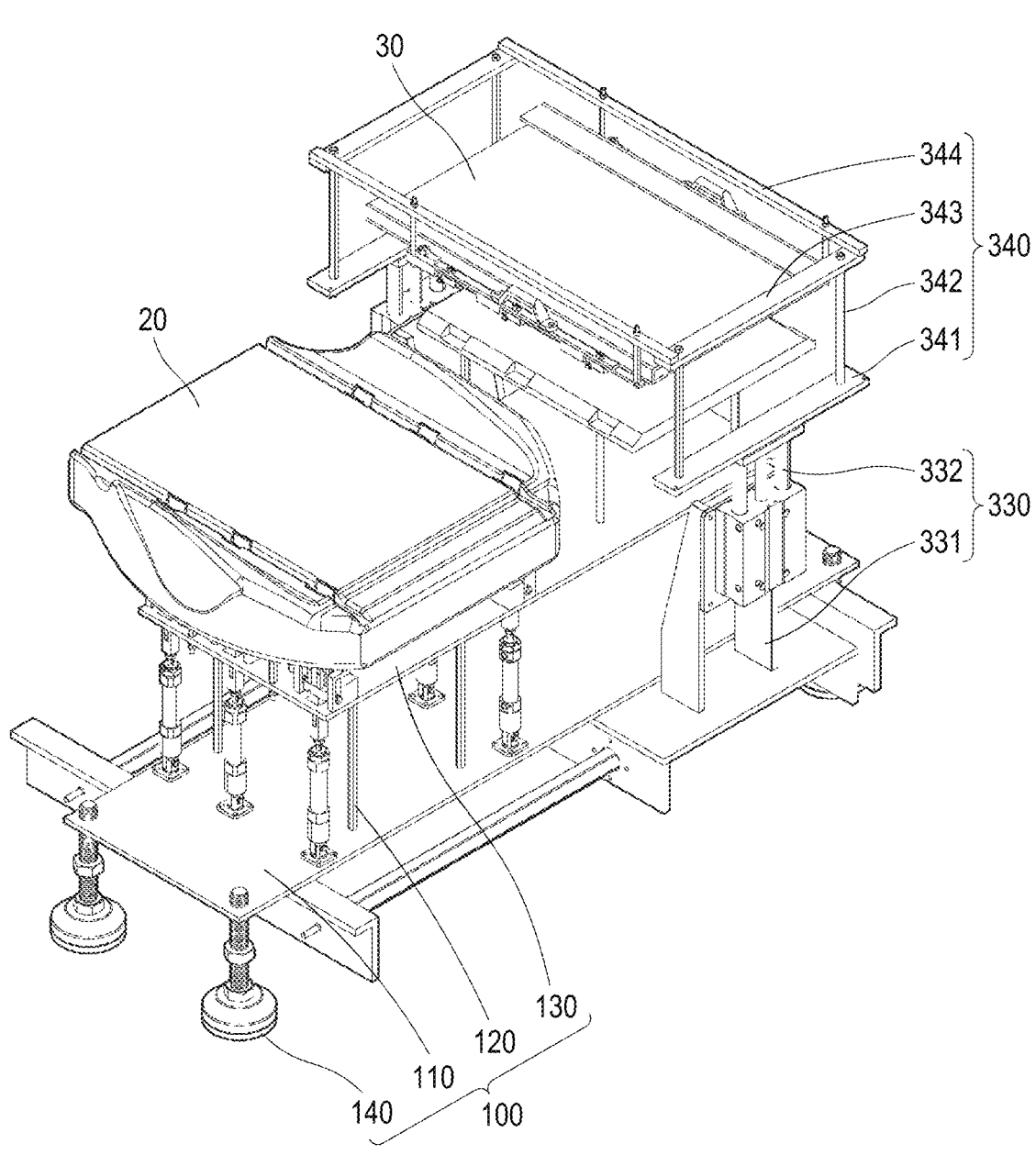
FIG. 5 shows a state in which the seat cover is raised by a cover operating portion of FIG. 4.
Figure 6:
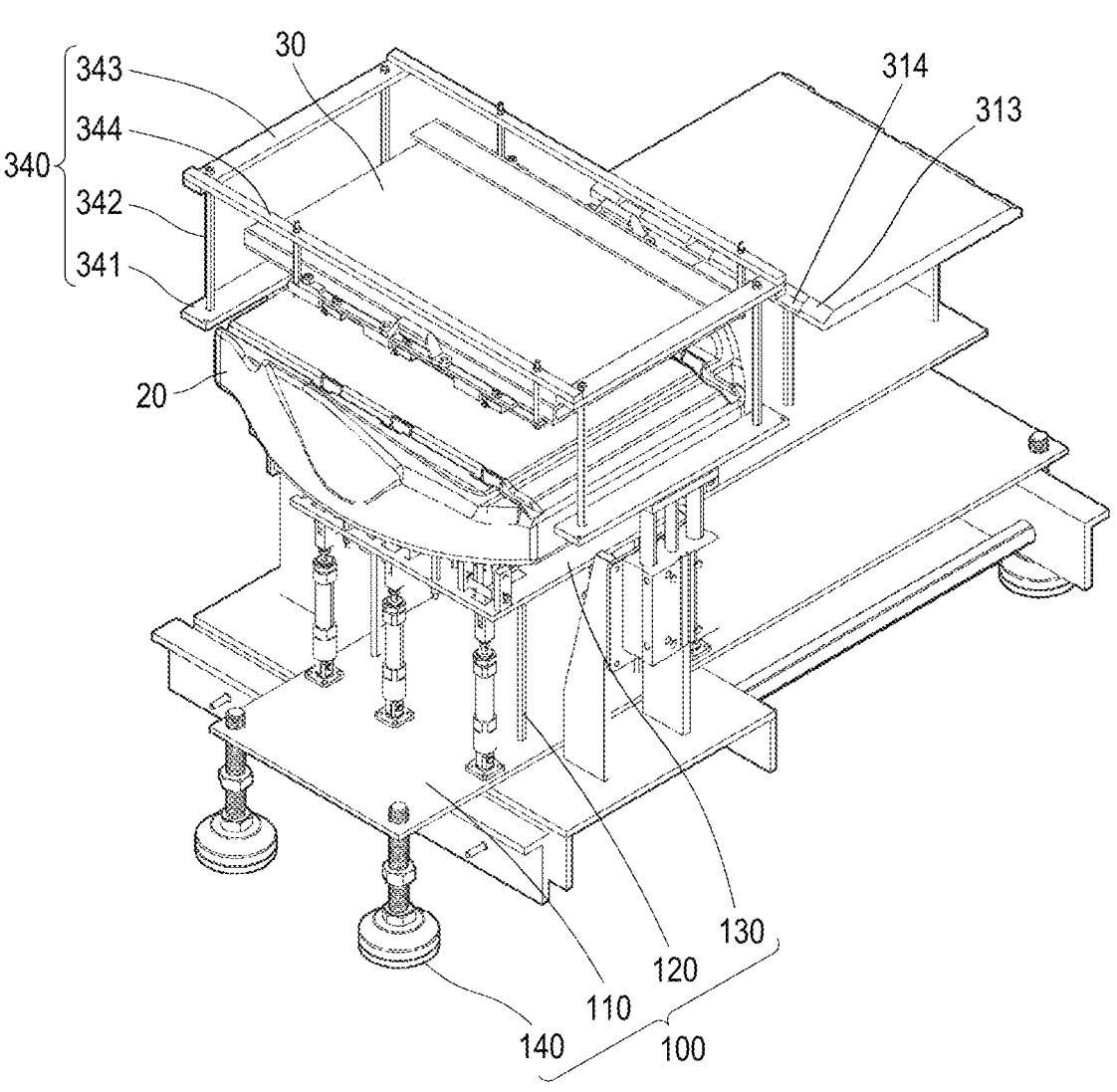
FIG. 6 shows a state in which the cover operating portion of FIG. 5 is moved onto the seat cushion.
Figure 7:
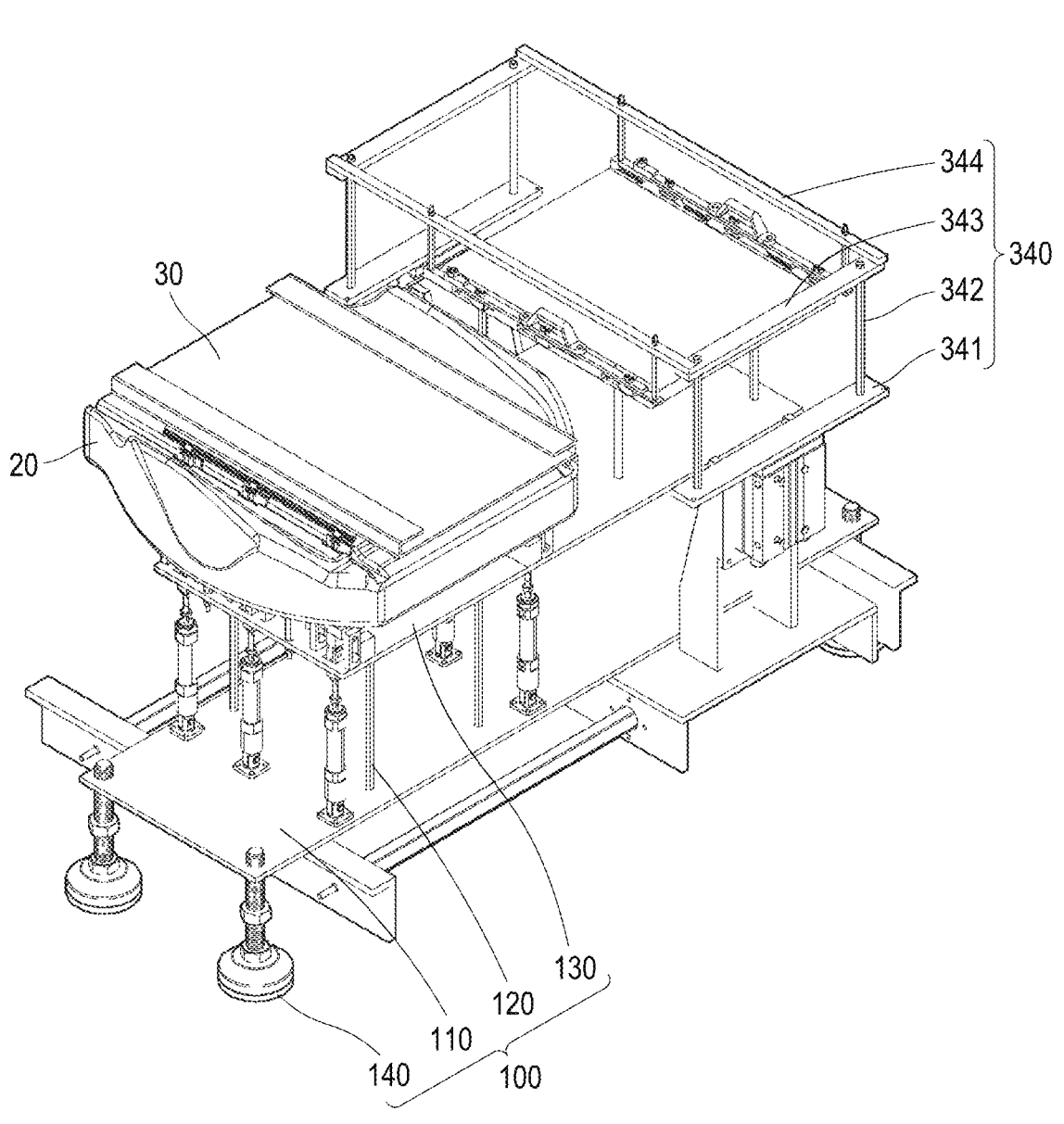
FIG. 7 shows a state in which the seat cover is disposed on the seat cushion by the cover operating portion of FIG. 6, and the cover operating portion is returned to an original position.

As shown in FIGS. 5 to 7, the holder (350) is moved to dispose the seat cover (30) on the seat cushion (20), and the holder (350) is moved to the original position.

That is, the holder (350) is moved onto the cushion operating portion (200) as shown in FIG. 23, the seat cover (30) in which the clamper (354) restricts the aligned clips (50) as shown in FIG. 24 is disposed on the seat cushion (20), the grip portion (260) is raised as shown in FIG. 25, the grip portion (260) restricts the clips (50) as shown in FIG. 18, the clamper (354) releases the restriction of the clips (50) as shown in FIG. 19, and the holder (350) is moved to the original position.

(5) Fifth Step

Figure 8:
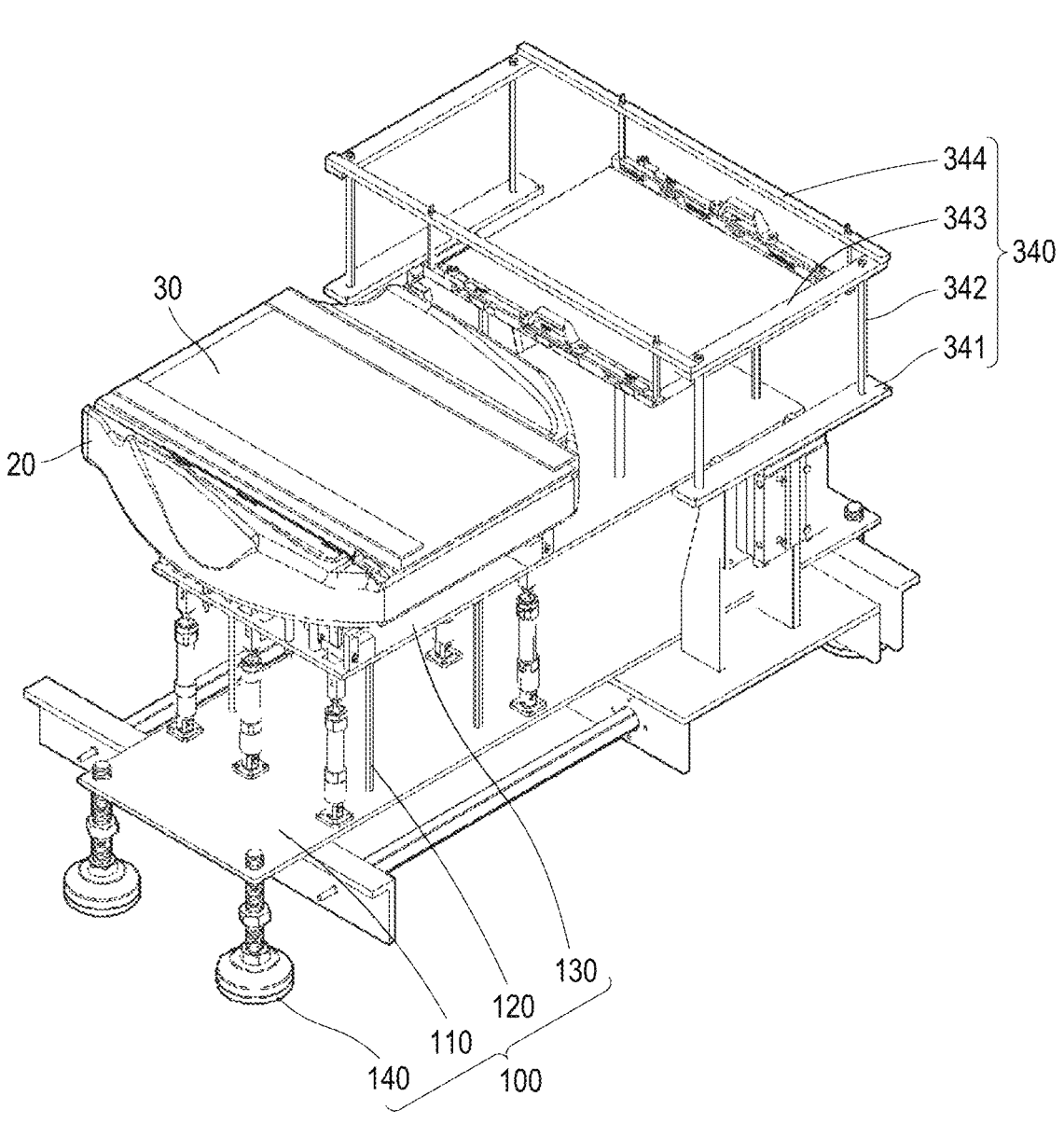
FIG. 8 shows a state in which the seat cover is coupled to the seat cushion by a cushion operating portion of FIG. 7.

As shown in FIG. 8, the clips (50) are fixed to the wire (60).

That is, when the clip (50) is lowered using the grip portion (260) as shown in FIG. 22, the wire (60) can be accommodated in the cavity (55) of the clip (50).

When the clip (50) is fixed to the wire (60), the grip portion (260) releases the restriction of the clip (50).

Although a specific embodiment of the present invention has been described and illustrated above, the present invention is not limited to the described embodiment, and it is obvious to those having ordinary knowledge in the field of the present technology that various changes and modifications can be made without departing from the concept and scope of the present invention.

Therefore, such a change example or a modification should not be individually understood from the technical concept or the viewpoint of the present invention, and the modified embodiment should belong to the scope of the present invention.

The present application is based on Korean Patent Application 10-2021-0095715 filed on Jul. 21, 2021, and the contents thereof are taken into reference here.

REFERENCE SIGNS LIST 10 vehicle seat assembly device
20 seat cushion
21 first through hole
30 seat cover
40 suspender
41 head portion
42 lock groove
43 joint portion
50 clip
51 lock portion
52 lock tab
53 hook portion
54 guide
55 cavity
56 insertion opening
60 wire
100 base portion
110 first plate
120 first supporting stand
130 second plate
140 pedestal
200 cushion operating portion
210 cushion placing stand
220 second supporting stand
230 first frame
240 block
241 V-shaped groove
242 second through hole
250 fastening portion
260 grip portion
261 first grip bar
262 first grip groove
263 second grip bar
264 second grip groove
270 coupling portion
271 drive portion
272 first assembly
273 second assembly
274 drive main body
280 first lifting portion
281 first cylinder
282 first hinge
283 second hinge
290 guide portion
291 first guide main body
292 first guide bar
293 first guide rail
294 first guide frame
295 second guide main body
296 second guide bar
297 second guide rail
298 second guide frame
300 cover operating portion
310 cover placing stand
311 third supporting stand
312 first table 313 first inclined surface
314 accommodating groove
320 transfer portion
321 second frame
322 shaft
323 second table
330 second lifting portion
331 fourth supporting stand
332 second cylinder
340 support portion
341 third frame
342 fifth supporting stand
343 fourth frame
344 fifth frame
350 holder
351 sixth supporting stand
352 sixth frame
353 seventh frame
354 clamper
355 movement groove
356 stopper
357 first insertion groove
358 second insertion groove
370 fixture
380 handle

The invention claimed is:
1. A vehicle seat assembly device comprising:
a base portion;
a cushion operating portion coupled to one side of the base portion, configured to allow a seat cushion formed with a plurality of first through holes to be disposed, and configured to couple a seat cover to the seat cushion; and
a cover operating portion coupled to another side of the base portion, configured to allow the seat cover to be disposed, and configured to transfer the seat cover onto the seat cushion,
wherein the cushion operating portion includes a cushion placing stand that is coupled to the base portion and configured to allow a wire and the seat cushion to be disposed, and
wherein the cushion operating portion includes a fastening portion that is coupled to the base portion, configured to lower a clip coupled to a suspender of the seat cover to the first through hole, and configured to fix the clip to the wire located below the seat cushion.
2. The vehicle seat assembly device according to claim 1, wherein the base portion includes
a first plate,
a plurality of first supporting stands coupled to an upper portion of the first plate, and
a second plate coupled to an upper portion of each of the first supporting stands.
3. The vehicle seat assembly device according to claim 2, wherein the cushion placing stand is coupled to the second plate, and
wherein the fastening portion is coupled to the first plate.
4. The vehicle seat assembly device according to claim 3, wherein the cushion placing stand includes
a plurality of second supporting stands coupled to the second plate,
a plurality of first frames coupled to the second supporting stands and configured to allow the seat cushion to be disposed, and
a plurality of blocks coupled to the first frames and configured to allow the wire to be disposed.

5. The vehicle seat assembly device according to claim 4, wherein at least one of the blocks is configured to be inserted into at least one of the first through holes such that a position of the seat cushion is maintained constant.

6. The vehicle seat assembly device according to claim 4, wherein a V-shaped groove is formed on at least one of the blocks such that a position of the wire is maintained constant.

7. The vehicle seat assembly device according to claim 4, wherein a second through hole is formed inside the blocks such that the fastening portion is movable up and down.

8. The vehicle seat assembly device according to claim 1, wherein the fastening portion includes a grip portion configured to restrict the clip, a coupling portion coupled to the grip portion and configured to actuate the grip portion, and a first lifting portion coupled to the coupling portion.

9. The vehicle seat assembly device according to claim 1, wherein the cover operating portion includes a cover placing stand coupled to the base portion and configured to allow the seat cover to be disposed, a transfer portion coupled to the base portion and configured to reciprocate between one side and the other side of the base portion, a second lifting portion coupled to the transfer portion, a support portion coupled to the second lifting portion, and a holder coupled to the support portion and configured to restrict the clip.

\* \* \* \* \*